United States Patent
Imagawa et al.

(10) Patent No.: US 7,986,352 B2
(45) Date of Patent: Jul. 26, 2011

(54) IMAGE GENERATION SYSTEM INCLUDING A PLURALITY OF LIGHT RECEIVING ELEMENTS AND FOR CORRECTING IMAGE DATA USING A SPATIAL HIGH FREQUENCY COMPONENT, IMAGE GENERATION METHOD FOR CORRECTING IMAGE DATA USING A SPATIAL HIGH FREQUENCY COMPONENT, AND COMPUTER-READABLE RECORDING MEDIUM HAVING A PROGRAM FOR PERFORMING THE SAME

(75) Inventors: Taro Imagawa, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/667,424

(22) PCT Filed: Jun. 17, 2009

(86) PCT No.: PCT/JP2009/002754
§ 371 (c)(1),
(2), (4) Date: Dec. 31, 2009

(87) PCT Pub. No.: WO2009/153983
PCT Pub. Date: Dec. 23, 2009

(65) Prior Publication Data
US 2010/0208104 A1    Aug. 19, 2010

(30) Foreign Application Priority Data
Jun. 18, 2008    (JP) .................................. 2008-159694

(51) Int. Cl.
*H04N 9/68* (2006.01)
(52) U.S. Cl. ...................... 348/234; 348/222.1; 348/252

(58) Field of Classification Search ............... 348/222.1, 348/252, 224.1, 234–238, 263, 265, 266, 348/267, 272, 255; 382/255
See application file for complete search history.

(56) References Cited

U.S. PATENT DOCUMENTS
2004/0051799 A1 * 3/2004 Yamanaka .................... 348/272
(Continued)

FOREIGN PATENT DOCUMENTS
JP    05-347730    12/1993
(Continued)

OTHER PUBLICATIONS

Supplemental European Search Report, issued Aug. 17, 2010 in EP Application 09 76 6431, which is a counterpart to the present application.

(Continued)

*Primary Examiner* — Nelson D. Hernández Hernández
(74) *Attorney, Agent, or Firm* — Wenderoth, Lind & Ponack, L.L.P.

(57) ABSTRACT

An image processing apparatus (30) generating an image with high resolution over a diffraction limit includes an image input unit (101) receiving red image data and green image data, which represent images of an object by red light and green light, respectively, and receiving a blue image data representing an image of the object by blue light having a wavelength shorter than the red and the green light. Further, the image processing apparatus (30) includes an image processing unit (103) correcting the red and the green image data by adding thereon a spatial high frequency component contained in the blue image data, such that the image input unit (101) receives, as the blue image data, image data generated by light receiving elements provided at intervals shorter than a size of a smallest area that the red and the green light can converge.

20 Claims, 20 Drawing Sheets

U.S. PATENT DOCUMENTS

| | | | |
|---|---|---|---|
| 2005/0219642 A1 | 10/2005 | Yachida et al. | |
| 2006/0093234 A1* | 5/2006 | Silverstein | 382/255 |
| 2007/0201149 A1 | 8/2007 | Nishioka | |
| 2008/0024653 A1 | 1/2008 | Ikeda | |
| 2008/0158377 A1* | 7/2008 | Chanas et al. | 348/222.1 |
| 2009/0074324 A1 | 3/2009 | Ishiga et al. | |

FOREIGN PATENT DOCUMENTS

| | | |
|---|---|---|
| JP | 07-203318 | 8/1995 |
| JP | 3363477 | 1/2003 |
| JP | 2005-318548 | 11/2005 |
| JP | 2007-226033 | 9/2007 |
| JP | 2008-035268 | 2/2008 |
| WO | 2006/095110 | 9/2006 |
| WO | 2007/007878 | 1/2007 |

OTHER PUBLICATIONS

International Search Report issued Aug. 11, 2009 in International (PCT) Application No. PCT/JP2009/002754.

Pentland, Alex Paul, "*A New Sense for Depth of Field*", IEEE Transactions on Pattern Analysis and Machine Intelligence, vol. 9, No. 4, Jul. 1987, pp. 523-531.

\* cited by examiner

FIG. 6
(a) Multi-element system
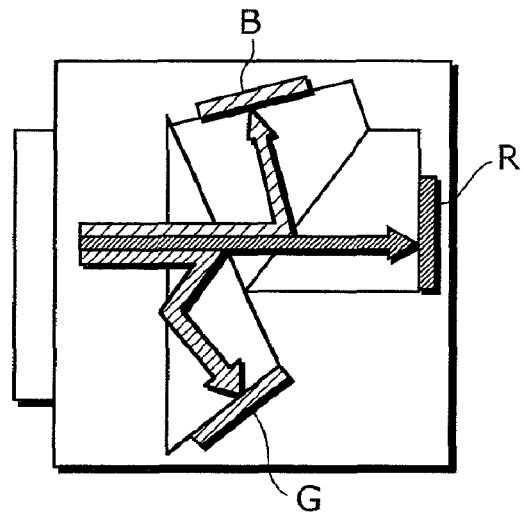
(b) Single-element multi-layered system
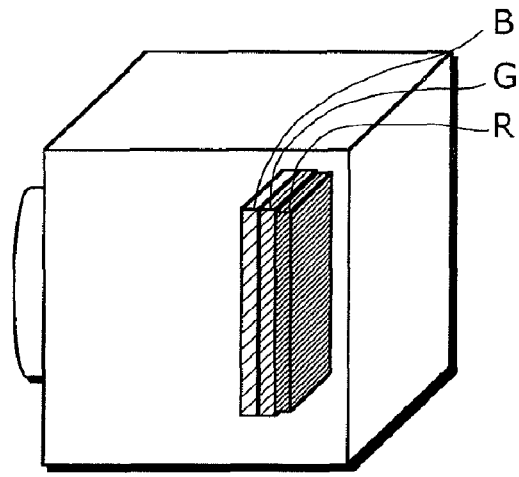
(c) Single-element single-layered system
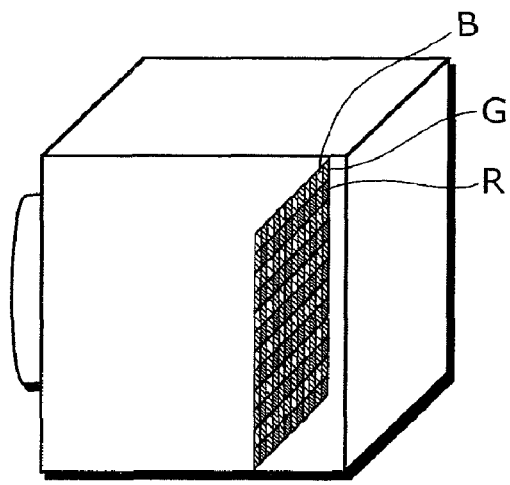

FIG. 10
RGB
(a) 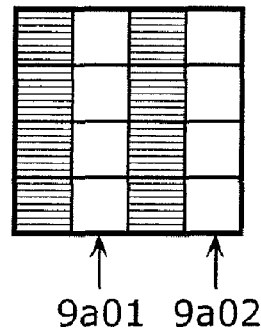
↑ ↑
9a01 9a02
RGB
(b) 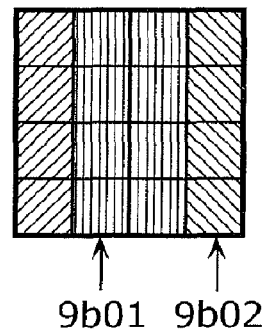
↑ ↑
9b01 9b02
RGB
(c) 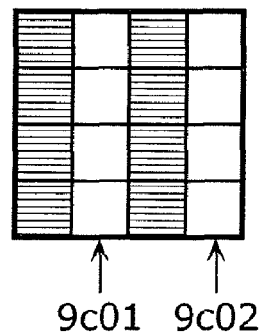
↑ ↑
9c01 9c02

FIG. 12
UV
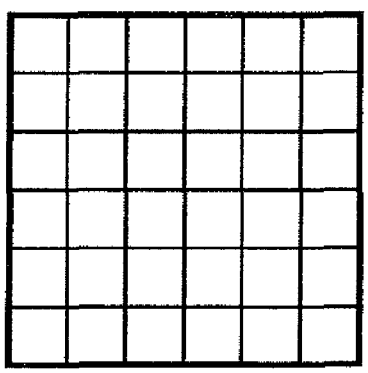
B
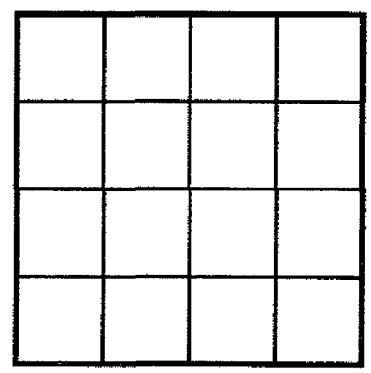
G
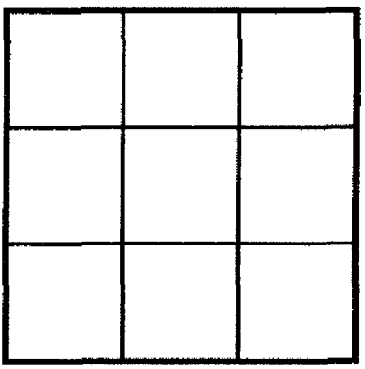
R
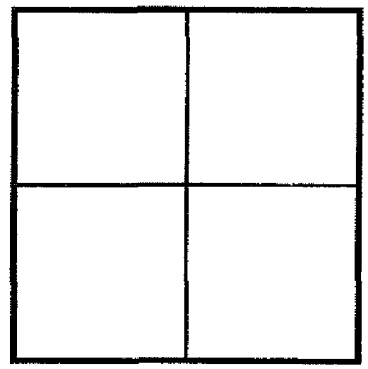

FIG. 13
(a)
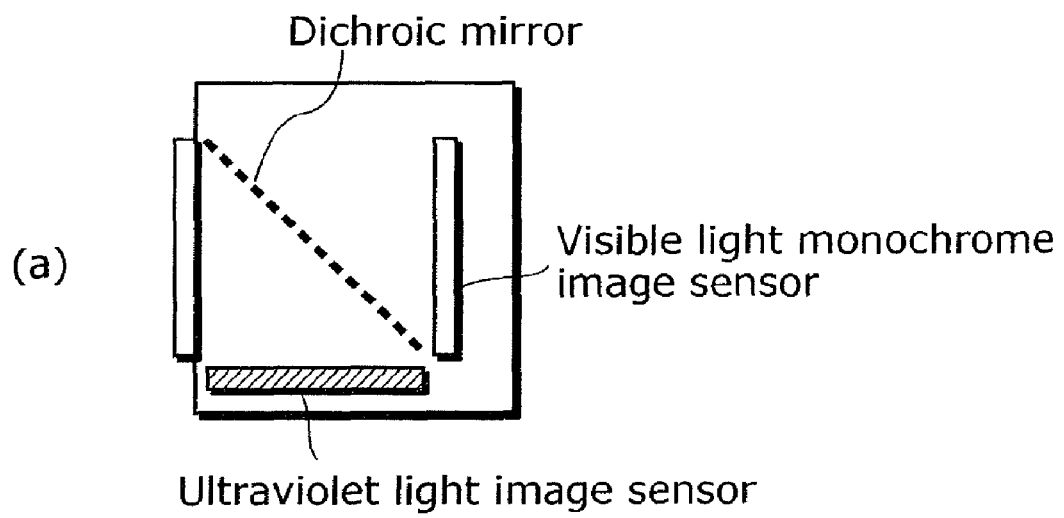
Dichroic mirror
Visible light monochrome image sensor
Ultraviolet light image sensor
(b)
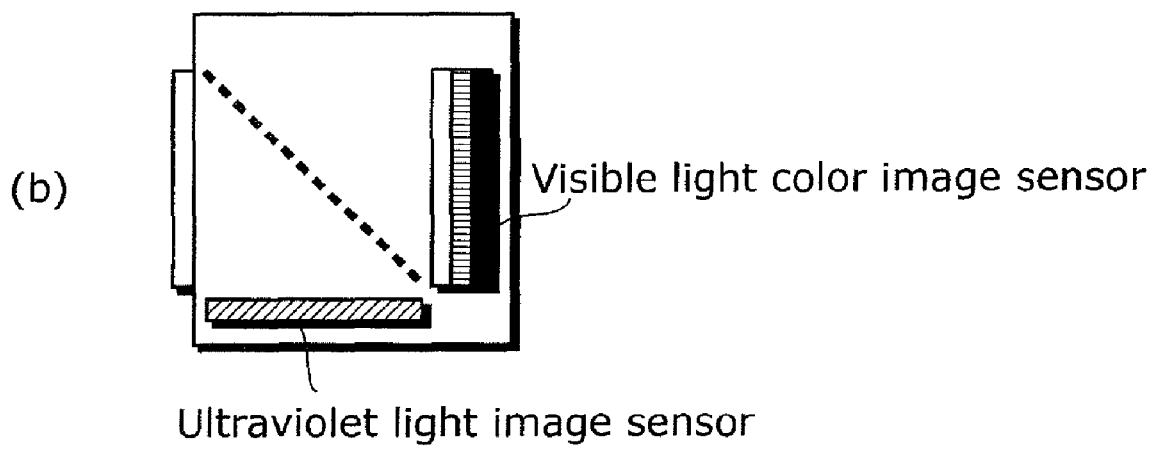
Visible light color image sensor
Ultraviolet light image sensor

IMAGE GENERATION SYSTEM INCLUDING A PLURALITY OF LIGHT RECEIVING ELEMENTS AND FOR CORRECTING IMAGE DATA USING A SPATIAL HIGH FREQUENCY COMPONENT, IMAGE GENERATION METHOD FOR CORRECTING IMAGE DATA USING A SPATIAL HIGH FREQUENCY COMPONENT, AND COMPUTER-READABLE RECORDING MEDIUM HAVING A PROGRAM FOR PERFORMING THE SAME

BACKGROUND OF THE INVENTION

1. Field of Invention

The present invention relates to an image processing apparatus for correcting image data, and in particular, to a technique for enhancing definition of image data.

2. Description of the Related Art

Image sensors of digital cameras, which have become prevalent in recent years, are provided with an increasingly larger number of pixels to enhance image quality, and become reduced in size to enhance portability. To provide such downsized image sensors with more pixels, some progress has been made on reduction in size of each pixel of digital image sensors.

However, on an imaging plane of a camera including an image sensor, incident light is diffracted and thus causes diffraction blur, which leads to a problem, wherein making each pixel of the image sensor smaller than the size of the diffraction blur does not enhance resolution (diffraction limit). Specifically, the diffraction blur has more influence when the lens of the imaging optical system is stopped down.

Conventional imaging apparatuses for curbing such influence given by the diffraction blur are described in Patent literature 1 and Patent literature 2.

The imaging apparatus in Patent literature 1 decreases a gain of its image sensor, instead of stopping down the lens of the imaging optical system, upon capturing an image of an object when an amount of light from the object is large. By doing so, signal outputs from the image sensor will not be excess, which prevents generation of the diffraction blur that is caused by stopping down the lens.

The imaging apparatus in Patent literature 2 uses, instead of stopping down the lens of the imaging optical system, a neutral density (ND) filter to control an amount of incident light, so as to reduce the incident light when the amount of light is large upon capturing an image. Such use of the ND filter prevents generation of the diffraction blur that is caused by stopping down the lens.

Patent Literature

Patent Literature 1: Japanese Patent No. 3363477.
Patent Literature 2: Japanese Unexamined Patent Application Publication No. 2008-35268.

BRIEF SUMMARY OF THE INVENTION

Technical Problem

However, the imaging apparatuses in Patent literatures 1 and 2, which are capable of preventing the diffraction blur that is caused by stopping down the lens, cannot avoid diffraction blur that has already been caused with the aperture open. This means that the diffraction blur, which defines a limit of resolution of a downsized image sensor, cannot be avoided.

In view of this, the present invention was conceived with the aim of providing an image processing apparatus which is capable of generating an image with high resolution over the diffraction limit with an image sensor and an optical system using an existing material having a positive refractive index.

Solution to Problem

In order to solve the above problem, an image processing apparatus according to an aspect of the present invention includes: an image input unit configured to receive a plurality of image data which represent images of a same object formed by light having different wavelengths and each of which represents one of the images formed by light having a corresponding one of the wavelengths; and an image processing unit configured to correct first image data included in the plurality of image data, by adding to the first image data a spatial high frequency component which is contained in second image data included in the plurality of image data, the first image data corresponding to light having a first wavelength, and the second image data having a second wavelength shorter than the first wavelength, wherein the image input unit is configured to receive, as the second image data, image data which is generated by using light receiving elements provided at intervals shorter than a size of a smallest area that the light having the first wavelength can converge.

It is to be noted that the present invention may be implemented not only as the image processing apparatus but also as, for example, an imaging apparatus, an image processing method, a program causing a computer to execute the method, and a computer-readable recording medium such as a CD-ROM on which the program has been recorded.

Advantageous Effects of Invention

The image processing apparatus of the present invention adds to the first image data corresponding to light having a first wavelength, a spatial high frequency component which is contained in second image data corresponding to light having a second wavelength shorter than the first wavelength. Moreover, the second image data used here is the image data which is generated by using light receiving elements provided at intervals shorter than a size of a smallest area that the light having the first wavelength can converge, with the result that the first image data can be given spatial high frequency information over the diffraction limit of the light having the first wavelength (which is hereinafter referred to as resolution enhancement).

The image processing apparatus according to the aspect of the present invention has favorable adaptability to, for example, an existing color imaging system. Specifically, the present invention can be easily applied to the existing color imaging system in a manner that upon processing image data for different colors such as red, green, and blue, which are generated by capturing images of the same object with light of these colors (i.e., in different wavelengths), the image data for red or green is treated as the first image data and the image data for blue is treated as the second image data.

Further, applying the present invention allows for easy enhancement in resolution of image data which corresponds to the light of a color in a long wavelength without the need for a new optical material, optical device, etc.

BRIEF DESCRIPTION OF DRAWINGS

FIGS. 6(a) to 6(c) are views each showing a concrete example of a configuration of the imaging apparatus;

FIGS. 10(a) to 10(c) are views each showing one example of a generated color image;

FIG. 12 is a view showing an example of a pixel layout of the imaging apparatus;

FIGS. 13(a) and 13(b) are views each showing a concrete example of the imaging apparatus;

DETAILED DESCRIPTION OF THE INVENTION

Figure 1:
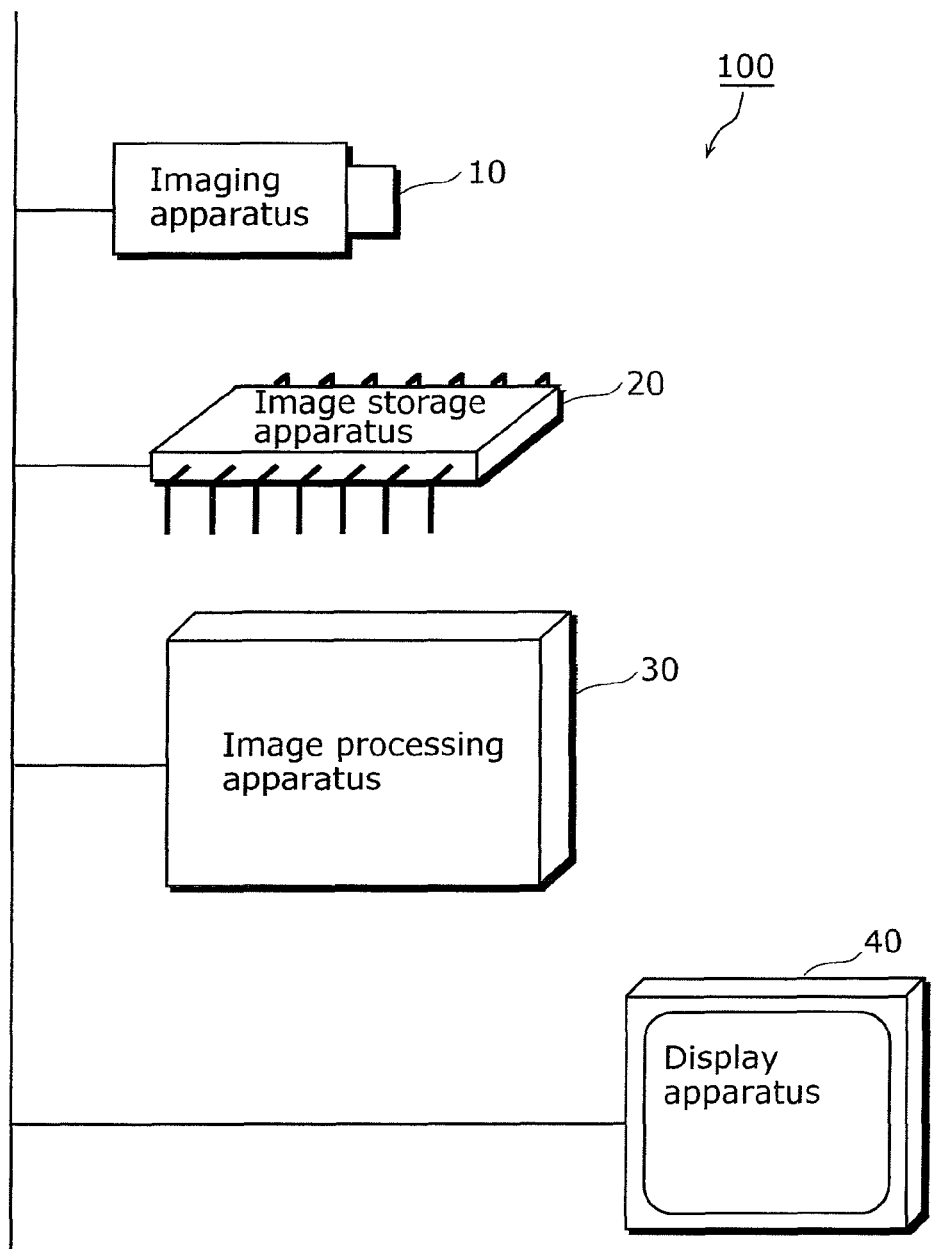
FIG. 1 is a block diagram showing a hardware configuration of an image generation system according to an embodiment of the present invention.

The image processing apparatus according to an aspect of the present invention includes: an image input unit configured to receive a plurality of image data which represent images of a same object formed by light having different wavelengths and each of which represents one of the images formed by light having a corresponding one of the wavelengths; and an image processing unit configured to correct first image data included in the plurality of image data, by adding to the first image data a spatial high frequency component which is contained in second image data included in the plurality of image data, the first image data corresponding to light having a first wavelength, and the second image data corresponding to light having a second wavelength shorter than the first wavelength, wherein the image input unit is configured to receive, as the second image data, image data which is generated by using light receiving elements provided at intervals shorter than a size of a smallest area that the light having the first wavelength can converge.

Further, the image input unit may receive, as the first image data, image data which is generated by using the light receiving elements arranged less densely than the light receiving elements used for generating the second image data.

With this structure, the image formed by the light having a long wavelength is composed of the small number of pixels, providing an advantage that a speed of reading the pixels can be lower upon capturing an image. Moreover, the decrease in the number of pixels of the image formed by the light having a long wavelength allows for an increase in the size of each pixel, which makes it possible to reduce the decrease in the S/N ratio even with insufficient amount of light, e.g., in a dark place.

Further, the image input unit may receive, as the second image data, image data which represents an image of the object formed by ultraviolet light.

This structure enables obtaining a visible light image with high resolution over the diffraction limit of visible light. In this case, there is also an effect that the visible light image has enhanced color reproducibility because the ultraviolet light is separated from the incident light and used for the resolution enhancement process only.

Further, the image processing unit may correct both the first image data and the second image data so as to maintain spatial color continuity in a color image which is represented by the corrected first image data and the corrected second image data.

This structure provides an effect of reducing a false color which could be generated in a color image formed of combinations of the first image data corrected and the second image data.

Further, the image input unit may receive, as the second image data, image data which is generated by using the light receiving elements provided at a position on which the light having the second wavelength is focused.

With this structure, the focus blur of the image formed by the light having the second wavelength is the minimum, which means that the second image data contains a lot of the spatial high frequency components, which can be added to the first image data to effectively enhance resolution thereof.

Further, the image processing unit may further include a imaging condition obtaining unit configured to obtain imaging condition data indicating an aperture value which is a imaging condition on which the first image data is generated, wherein the image processing unit may (i) determine whether or not the first image data needs to be corrected, based on the obtained imaging condition data, and (ii) correct the first image data only when the image processing unit determines that the first image data needs to be corrected.

With this structure, it is possible to determine that the correction process is not necessary when it is determined based on the aperture that the image represented by the first image data has diffraction blur which does not exceed the diffraction limit. As no correction process is performed on the image whose diffraction blur does not exceed the diffraction limit, time and energy for the process can be saved.

Further, the image processing unit may further include a imaging condition obtaining unit configured to obtain imaging condition data indicating a focal length which is a imaging condition on which the first image data is generated, wherein the image processing unit may (i) determine whether or not the first image data needs to be corrected, based on the obtained imaging condition data, and (ii) correct the first image data, only when the image processing unit determines that the first image data needs to be corrected.

With this structure, it is possible to determine that the correction process is not necessary when it is determined based on the focal length that the image represented by the first image data has diffraction blur which does not exceed the diffraction limit. As no correction process is performed on the image whose diffraction blur does not exceed the diffraction limit, time and energy for the process can be saved.

Further, the image processing unit may further include a imaging condition obtaining unit configured to obtain imaging condition data indicating a position of a plane in which the light receiving elements are provided, the position of the plane being a imaging condition on which the first image data is generated, wherein the image processing unit may perform processing to remove a focus blur in the first image data in accordance with a displacement of the plane in which the light receiving elements are provided and whose position is indicated by the obtained imaging condition data, relative to a position on which the light having the first wavelength is focused.

With this structure, according to a position of the plane in which the light receiving elements are provided, the first image data is treated with a focus blur removal process which depends on the displacement of the plane relative to the position on which the light having the first wavelength is focused, with the result that the first image data can be corrected to have still higher image quality than in the case of performing only diffraction blur correction.

Further, the image input unit may receive red image data representing an image of the object formed by red light included in the light having different wavelengths, green image data representing an image of the object formed by green light included in the light having different wavelengths, and the blue image data representing an image of the object formed by blue light included in the light having different wavelengths, and the image processing unit may correct at least one of the red image data and the green image data by adding a spatial high frequency component which is contained in the blue image data, to at least one of the red image data and the green image data, wherein the image input unit may receive, as the blue image data, image data which is generated by using light receiving elements provided at intervals shorter than a size of a smallest area that the red light and the green light can converge.

With this structure, the high frequency component of the image data corresponding to the blue light can be used to correct the image data corresponding to the red or green light to provide higher image quality.

Further, the image processing unit may correct target image data included in the plurality of image data, by adding to the target image data a spatial high frequency component which is contained in reference image data included in the plurality of image data, the reference image data corresponding to light having a shortest wavelength, and the target image data corresponding to light having another wavelength, and the image input unit may receive, as the reference image data, image data which is generated by using light receiving elements provided at intervals shorter than a size of a smallest area that the light having the another wavelength can converge.

With this structure, the high frequency component of the image data corresponding to the light having the shortest wavelength can be used to correct the image data corresponding to other light to provide higher image quality.

Further, the image processing apparatus according to an aspect of the present invention includes: an image input unit configured to receive a plurality of image data which represent images of a same object formed by light having different wavelengths and each of which represents one of the images formed by light having a corresponding one of the wavelengths; and an image processing unit configured to correct first image data included in the plurality of image data, by adding to the first image data a spatial high frequency component which is contained in second image data included in the plurality of image data, the second image data corresponding to light having a wavelength in which a smallest area that the light can converge is smallest, and the first image data corresponding to light having another wavelength, wherein the image input unit is configured to receive, as the second image data, image data which is generated by using light receiving elements provided at intervals shorter than a size of the smallest area that the light having the another wavelength can converge.

With this structure, the high frequency component of the image data corresponding to the light having a wavelength in which a smallest area that the light can converge is the smallest, can be used to correct the image data corresponding to other light to provide higher image quality.

First Embodiment

An image generation system according to a first embodiment of the present invention shall be described below in detail with reference to the drawings.

FIG. 1 is a block diagram showing a hardware configuration of an image generation system 100 according to an embodiment of the present invention.

The image generation system 100 includes an imaging apparatus 10, an imaging storage apparatus 20, an image processing apparatus 30, and a display apparatus 40.

The imaging apparatus 10 is a camera with which an object is photographed from one view point or view points positioned so close to the object that disparity can be ignored, thereby generating first image data which represents a long-wavelength image that is an image of the object formed by light having a first wavelength, and second image data which represents a short-wavelength image that is an image of the object formed by light having a second wavelength.

The imaging apparatus 10 includes a plurality of light receiving elements for the light having the first wavelength, which are used to generate the first image data, and a plurality of light receiving elements for the light having the second wavelength, which are used to generate the second image data. The light receiving elements for the light having the second wavelength are provided at intervals shorter than the smallest area that the light having the first wavelength can converge (which is known as the circle of least confusion).

In the following example, the imaging apparatus 10 will be explained as a color camera which photographs an object from one view point to generate red image data, green image data, and blue image data, which represent images of the object formed by red light, green light, and blue light, respectively.

In this case, the images formed by the red light and the green light correspond to the above long-wavelength image, and the red image data and the green image data correspond to the above first image data. Further, the image formed by the blue light whose wavelength is the shortest, corresponds to the above short-wavelength image, and the blue image data corresponds to the above second image data.

The image data of the respective colors are preferably generated at the same time when the object or the camera is moving while in photographing a still object by a still camera, the image data of the respective colors may be generated sequentially at different points of time.

The image storage apparatus 20 is a memory which temporarily stores the image data for each color (the red image data, the green image data, and the blue image data) generated by the imaging apparatus 10.

The image processing apparatus 30 is an apparatus which reads out the image data for each color (the red image data, the green image data, and the blue image data) stored in the image storage apparatus 20, and performs correction to enhance spatial resolution of the red image data and the green image data which are included the read-out multiple image data.

The display apparatus 40 is a display apparatus which displays a color image represented by the blue image data as well as the red image data and the green image data which have been corrected by the image processing apparatus 30.

It is to be noted that in this configuration, the image processing apparatus 30 is one example of the image processing apparatus according to the present invention. The image processing apparatus 30 may be implemented by hardware such as a dedicated circuit and may also be implemented by software such as an image processing program in a general-purpose calculator.

Figure 2:
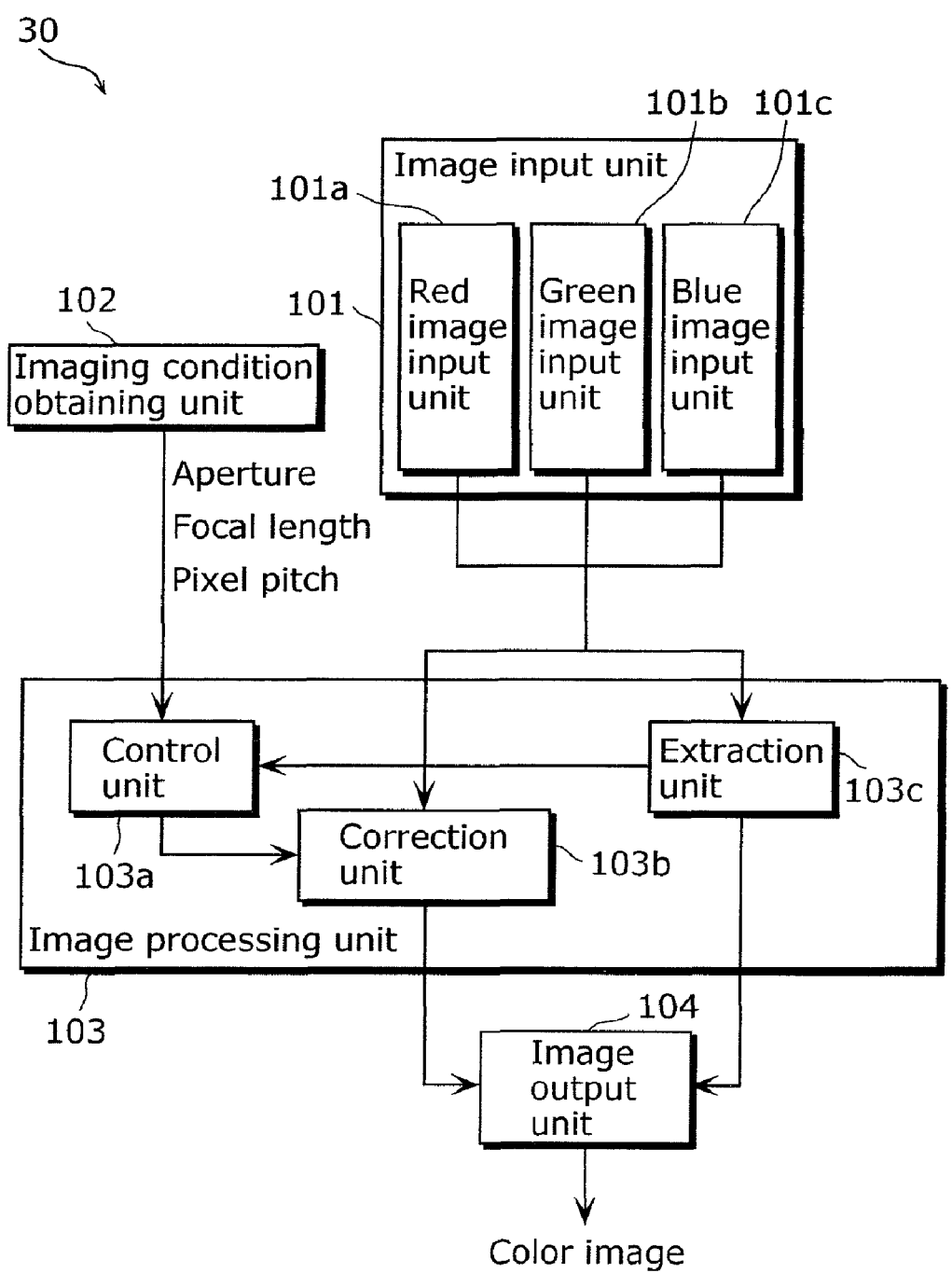
FIG. 2 is a functional block diagram showing a configuration of an image processing apparatus according to a first embodiment.

FIG. 2 is a functional block diagram showing an internal configuration of the image processing apparatus 30 in the image generation system 100 shown in FIG. 1. The image processing apparatus 30 includes an image input unit 101, a imaging condition obtaining unit 102, an image processing unit 103, and an image output unit 104.

The image input unit 101 is an interface which receives a plurality of image data corresponding to light of different wavelengths. The image input unit 101 includes a red image input unit 101a for obtaining the red image data, a green image input unit 101b for obtaining the green image data, and a blue image input unit 101c for obtaining the blue image data.

The image data inputted to the red image input unit 101a, the green image input unit 101b, and the blue image input unit 101c are of one object which is photographed with the imaging apparatus 10 from one view point or view points positioned so close to the object that disparity can be ignored. The blue image data is generated by the light receiving elements provided at intervals shorter than the sizes of the circles of least confusion formed by the red light and the green light.

Figure 3:
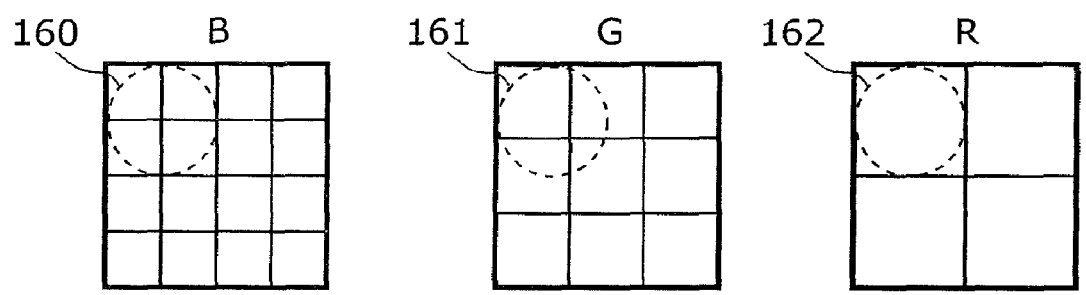
FIG. 3 is a view showing one example of a relationship between a size of diffraction blur and a pixel layout.

FIG. 3 is a view schematically showing one example of pixel layouts for respective colors of blue (B), green (G), and red (R), with a size of the circle of least confusion of the red light, which are depicted on the same scale for the respective colors, in corresponding image sensors of the imaging apparatus 10 which photographs an object by using light of these colors. In FIG. 3, circles 160 to 162 in broken lines represent the size of the circle of least confusion of the red light. Each one of the sections arranged in a matrix represents one pixel region, and each pixel region includes one light receiving element for blue, green or red light.

As shown in FIG. 3, pixel pitch for red (a distance between the adjacent light receiving elements for red light) corresponds to the size of the circle of least confusion of the red light, and pixel pitch for green (a distance between the adjacent light receiving elements for green light) and pixel pitch for blue (a distance between the adjacent light receiving elements for blue light) are smaller than the size of the circle of least confusion of the red light.

A detailed configuration of the imaging apparatus 10 and another example of the pixel layout in the image sensor will be explained later in detail.

Referring back to FIG. 2, the imaging condition obtaining unit 102 obtains imaging condition data, which includes an aperture, a focal length, and pixel pitch, as a imaging condition of the optical system in the imaging apparatus 10, on which the image data obtained by the image input unit 101 is generated.

The image processing unit 103 is a processing unit which includes a control unit 103a, a correction unit 103b, and an extraction unit 103c and which, in order to enhance resolution, corrects the red image data and the green image data with use of a spatial high frequency component included in the blue image data, out of the image data for respective colors obtained by the image input unit 101.

The control unit 103a (i) determines whether or not each of the red image data and the green image data needs to be corrected, based on the aperture, the focal length, and the pixel pitch, of the optical system, which are represented by the imaging condition data obtained by the imaging condition obtaining unit 102, and (ii) determines which wavelength (color) image data is to be corrected.

The extraction unit 103a extracts from the blue image data a high frequency component which is to be added to the image data determined by the control unit 103a.

The correction unit 103b adds, according to the determination made by the control unit 103a, the high frequency component which is extracted from the blue image data by the extraction unit 103c, to either one or both of the red image data and the green image data.

The image output unit 104 outputs a color image data that is a composite of image data of respective colors, which have been processed in the image processing unit 103.

The following shall describe the processes which are executed by the image processing apparatus 30 configured as above.

Figure 4:
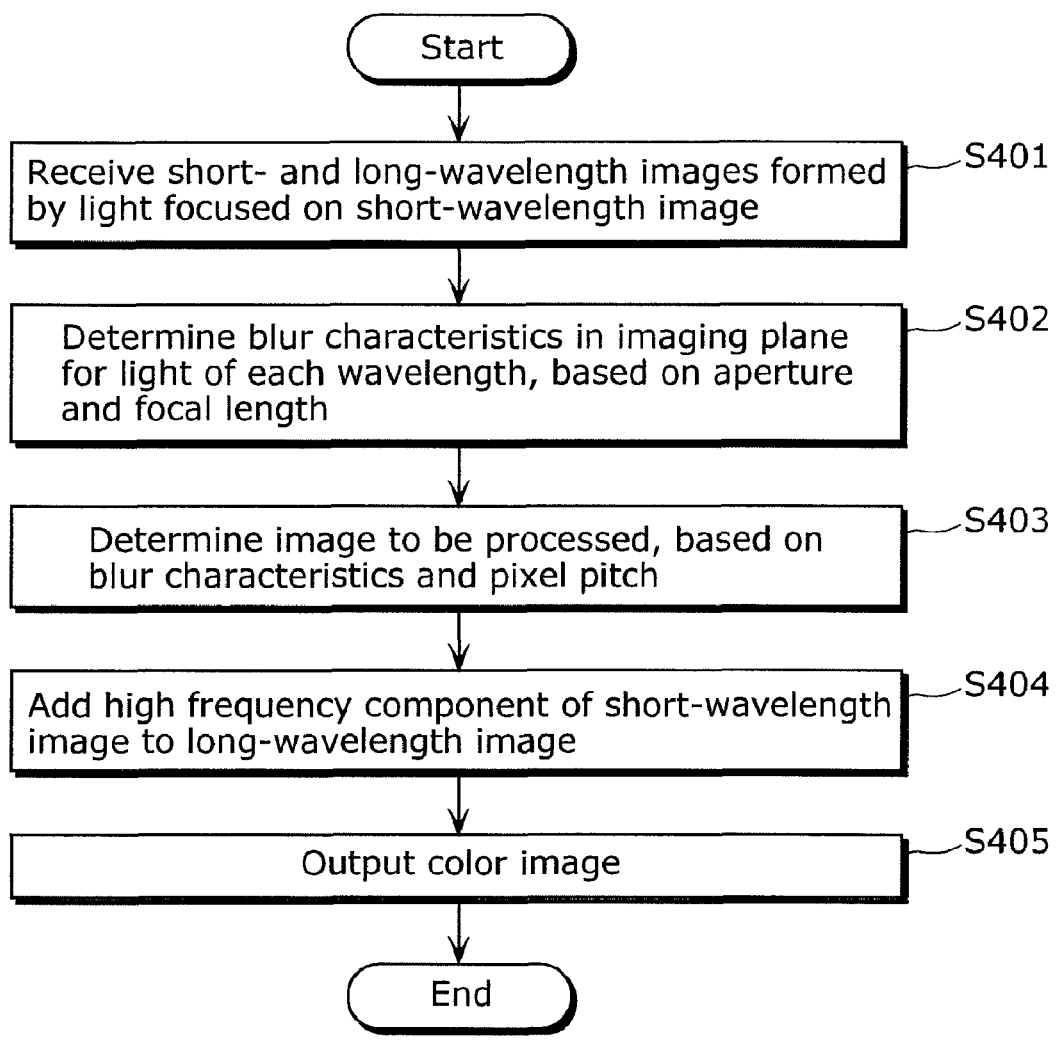
FIG. 4 is a flowchart showing operation of a first image processing apparatus.

FIG. 4 is a flowchart showing one example of the processes which are executed by the image processing apparatus 30.

In Step S401, the red image input unit 101a, the green image input unit 101b, and the blue image input unit 101c in the image input unit 101 obtain the red image data, the green image data, and the blue image data, respectively.

Now, a configuration of the imaging apparatus 10 for producing the image data obtained by the image input unit 101, and a layout of the light receiving elements will be explained in detail.

Figure 5:
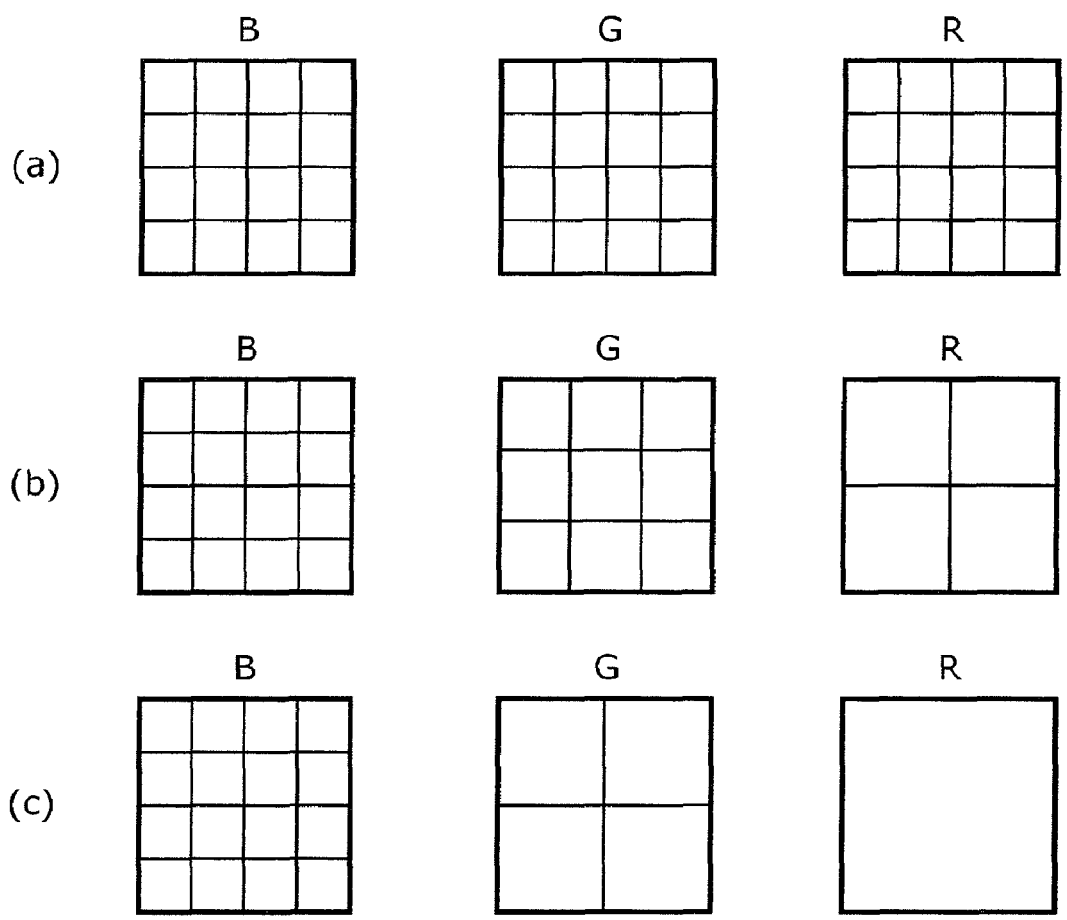
FIGS. 5(a) to 5(c) are views each showing an example of a pixel layout of an imaging apparatus.

FIGS. 5(a) to 5(c) are views each showing, in the same manner as in FIG. 3, an example of the pixel layout of the image sensor for each color in the imaging apparatus 10.

FIG. 5(a) shows an example where pixel pitches for the respective colors are equal to one another. In this case, the pixel density of the green image and red image is extremely high compared to that of the blue image, but there is an advantage that the pixel layouts for all the colors can be the same. In addition, extra pixels bring about another advantage of facilitating an interpolation process for pixel defects.

FIG. 5(b) shows an example where the pixel pitch for each color is wider as light of the corresponding color has a longer wavelength. In this case, the pixel pitch is wider for a color which leads to a larger diffraction blur, resulting in an efficient pixel layout for obtaining necessary and sufficient resolution. There are also other advantages that, as compared to the layout of FIG. 5(a), a speed of reading a pixel value can be lower, and for the green image and the red image, which have larger pixel sizes, light collection performance will be enhanced and therefore a S/N ratio will rise.

FIG. 5(c) shows an example where the pixel pitches for red and green are wider than those in FIG. 5(b). In this case, as compared to the case of FIG. 5(b), the speed of reading a pixel value can be yet lower, and the S/N ratio in imaging can be increased.

FIGS. 6(*a*) to 6(*c*) each show one example of the configuration of the imaging apparatus 10.

FIG. 6(*a*) shows one example of the configuration of the imaging apparatus using dichroic prisms, which employs a multi-element system. FIG. 6(*b*) shows one example of the configuration of the imaging apparatus which employs a single-element mufti-layered system. In each configuration, B denotes the image sensor for blue image, G denotes the image sensor for green image, and R denotes the image sensor for red image.

FIG. 6(*c*) shows one example of the configuration of the imaging apparatus which employs a single-element single-layered system.

Figure 7:
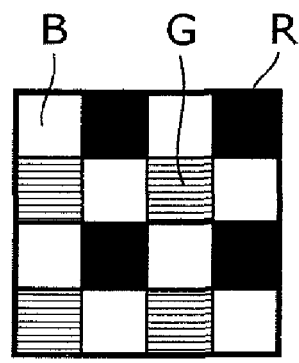
FIG. 7 is a view showing an example of a pixel layout of the imaging apparatus.

FIG. 7 is a view showing an example of the pixel layout of the image sensor used in the imaging apparatus which employs the single-element single-layered system. Each pixel of one image sensor has a color filter of one determined color selected for each pixel from among blue (B), green (G), and red (R).

In the image sensor of FIG. 7, the pixels for blue having the shortest wavelength are provided more densely than are the pixels for the other colors. This makes it possible to obtain a blue image, which is less influenced by diffraction, with high resolution.

In addition, it is desirable, upon using the image sensor of FIG. 7, to set an optical low pass prefilter which is generally used to prevent aliasing of high frequency components, to be effective only to the blue light.

Alternatively, the diffraction blur itself can be used instead of the low pass filter, resulting in a configuration excluding the low pass filter. In this case, there is an advantage that the image sensor has a simplified configuration. Thus, providing a low pass filter for light whose wavelength is longer than that of the blue light, prevents a decrease in the spatial high frequency component included in the blue image.

Photographing an object with the imaging apparatus 10 configured as above results in obtaining image data of respective colors with different diffraction blur characteristics for the object photographed from one view point.

In Step S402, the blur characteristics of light in each wavelength are determined based on the aperture and the focal length of the optical system, represented by the imaging condition data obtained by the imaging condition obtaining unit 102.

In the case of an optical system with a circular opening, for example, a minimum diameter of dark rings which appear, due to diffraction, in an image formed by light coming from a point light source, can be used as a size of diffraction blur D. In this case, the size of diffraction blur D is determined by $D=2.44\lambda \cdot f/d$ where d represents an aperture (diameter of the opening), f represents a focal length, and $\lambda$ represents a wavelength of the light.

Also, in the case of an optical system with a non-circular opening, there arises blur with a power spectrum distribution having a shape of the opening in the same scale as that in the case of the optical system with a circular opening.

Figure 8:
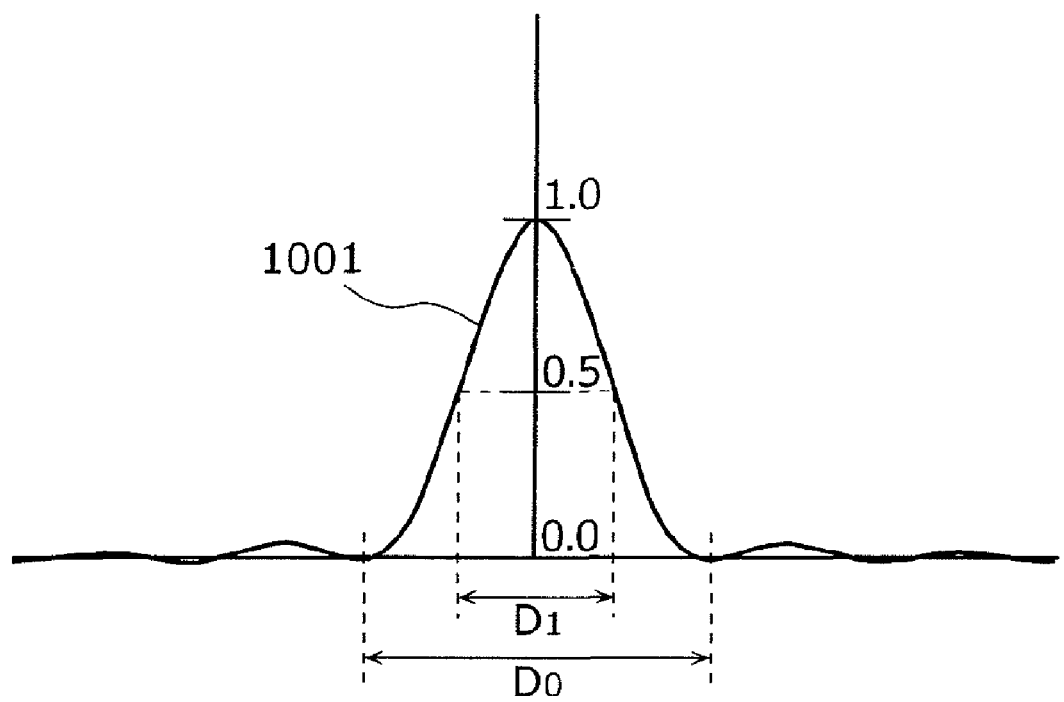
FIG. 8 is a view showing one example of a shape of diffraction blur.

FIG. 8 is a graph showing one example of a light intensity distribution of the diffraction blur. A graph 1001 shown in FIG. 8 shows a light intensity distribution of an image formed by light coming from a point light source in the case with the circular opening. The vertical axis represents light intensity (brightness) of the image, of which maximum is set at 1.0. The horizontal axis represents a distance from a center position of the image. As shown in the graph 1001, the image is the brightest at the center position around which concentric bright rings are formed.

As mentioned above, the minimum diameter of dark rings where the light intensity of the image formed by light coming from a point light source is theoretically zero ($D_0$ in FIG. 8) is used as the size of diffraction blur D. Alternatively, the area on which the diffraction blur substantially has influence, such as a diameter ($D_1$ in FIG. 8) of the area where the image has light intensity of a certain ratio (e.g., 1/2=0.5, 1/3) of the maximum light intensity, may be determined to be used as the size of diffraction blur D. The characteristics of diffraction blur in the image for each color are thus determined based on the aperture and the focal length.

Next, in Step S403, the diffraction blur characteristics for each color which are determined in Step S402, and the distances among the image sensors for each color, are used to determine the color of which image data shall be subjected to the resolution enhancement process.

Suppose that the size (e.g., diameter) of diffraction blur formed by light having a long wavelength (color A) is larger than the pixel pitch in the image sensor for light having a short wavelength (color B), then the image data of color A is determined to be subject to the resolution enhancement process.

For example, in the case where the pixel pitch in the image sensor for blue light is smaller than both sizes of diffraction blur formed by red light and by green light, the high frequency component of the blue image data is added to the red image data and the green image data. In the case where the pixel pitch in the image sensor for blue light is larger than the size of the diffraction blur formed by green light, the high frequency component of the blue image data is added to only the red image data.

In Step S404, according to the determination made in Step S403, the high frequency component of the image data corresponding to the light having a short wavelength is added to the image data corresponding to the light having a long wavelength. For example, in the case where the sizes of diffraction blur on the red image and on the green image exceed the distance between the provided light receiving elements in the image sensor for blue light, the high frequency component of the blue image is added to the red image to form a new red image and a new green image.

As for a method of adding the high frequency component, the Fourier transform is used to transform the red image data fr, the green image data fg, and the blue image data fb into frequency spaces Fr, Fg, and Fb, respectively, and then, the frequency component Fb ($\omega$) [$\omega > \omega_{th}$] of the blue image data Fb ($\omega$) which exceeds the upper limit "$\omega_{th}$" of the frequencies determined from the diffraction blur formed by the red light, is added to the red image data Fr ($\omega$) to generate corrected red image data Fr' ($\omega$). The corrected red image data Fr' ($\omega$) is then transformed by the inverse Fourier transform, resulting in corrected red image data fr which has the high frequency component of the blue image data fr added.

The same process is performed on the green image data fg, resulting in corrected green image data fg'.

Although the above example explains the transform into the frequency space using the Fourier transform, other transforms that transform an image into a frequency space, such as the discrete cosine transform or the wavelet transform, and inverse transforms paired therewith may be used.

Figure 9:
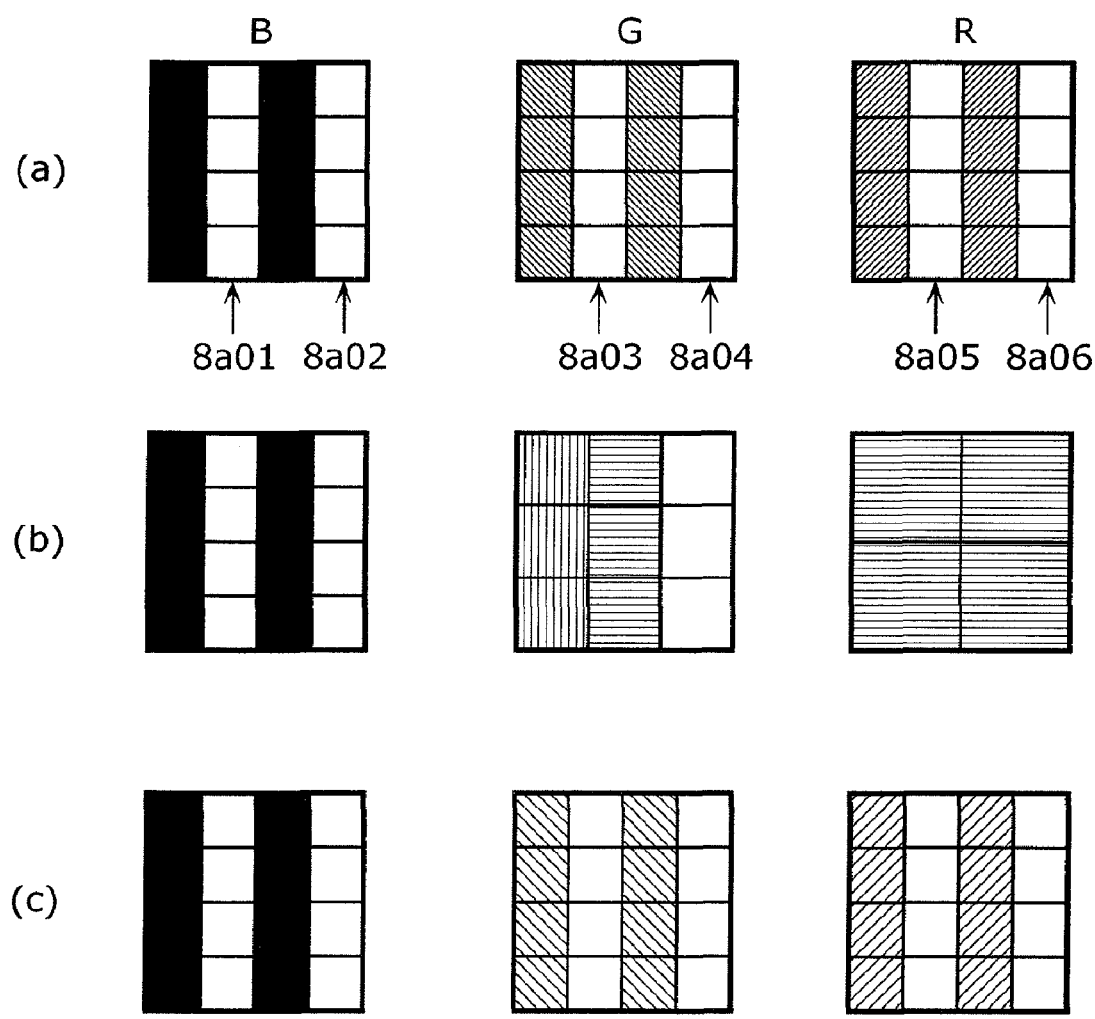
FIGS. 9(a) to 9(c) are views each showing one example of a red image, a green image, and a blue image.

Referring to FIGS. 9(*a*) to 9(*c*), the following shall describe the correction process in Step S404 for resolution enhancement. FIG. 9(*a*) shows an example of ground truth image, FIG. 9(*b*) shows an example of uncorrected image, and FIG. 9(*c*) shows an example of corrected image, for each of the blue (B), green (G), and red (R) images. Small rectangles constituting each image in FIG. 9(*a*) to FIG. 9(*c*) represent sizes and positional relations of the pixels, and a different pattern of the rectangles means a different pixel value.

FIG. 9(a) shows the images of the object photographed on condition that the diffraction blur of images of any colors does not exceed the diffraction limit. In FIG. 9(a), each of the blue image, the green image, and the red image has 16 pixels disposed in a 4×4 matrix, representing alternate vertical strips.

FIG. 9(b) shows an image of the object, which is the same object as that in FIG. 9(a), photographed with the pixel size and pixel pitch adjusted in accordance with the size of diffraction blur. Such an image can be obtained by photographing the object with the image sensor having the light receiving elements provided as shown in FIG. 5(b), for example. The pixel pitch of the blue image is set to be the same as that shown in FIG. 9(a) because the diffraction blur in the blue image is small, while the pixel pitch of the green image and the red image, in which diffraction blur will be larger than that in the blur image, is set to be large. Due to the diffraction blur, the green image and the red image in FIG. 9(b) can only be spatially-blurred images, respectively, of the green image and the red image in FIG. 9(a).

In Step S404, the high frequency component which is not contained in the blurred images such as the red image and the green image in FIG. 9(b) (the frequency component of the alternate vertical strips) is extracted from the blue image. The extracted high frequency component is then added to the red image and the green image in FIG. 9(b), which are obtained through actual photographing. In adding the high frequency component, if the number of pixels before the resolution enhancement does not reach the number of pixels required after the resolution enhancement (in the case of the green image and the red image in FIG. 9(b)), the interpolation is performed, when adding the high frequency component, to form an image with the required number of pixels.

FIG. 9(c) shows an example of the resultant images after the superimposition. The green image and the red image in FIG. 9(c) respectively result from the conversion of the green image and the red image in FIG. 9(b) into 16 (4×4 matrix)-pixel images through the interpolation process, followed by adding the high frequency component thereon. As a result of adding the high frequency component of the blue image, the frequency components in alternate vertical strips are reproduced.

Next, in Step S405, an RGB color image represented by the blue image and the corrected red and green images is outputted.

For comparison, FIG. 10(a) shows a color image represented by the red, green, and blue images in FIG. 9(a). This color image also has alternate vertical strips.

FIG. 10(b) shows a color image that is obtained by combining the red, green, and blue images in FIG. 9(b). In combining images to form such a color image as shown in FIG. 10(b), if the number of pixels of each of the original red, green, and blue images is smaller than the number of pixels of the color image to be formed, the interpolation process is performed before the color combination to form an image having the corresponding number of pixels. The image shown in FIG. 10(b), which is combined with the green and red images having low spatial resolution, blurs more than the blue image alone.

Moreover, the combination with the green and red images will undesirably generate a color that does not exist in the object (false color), even at the pixel positions (the column 8a01 to the column 8a06) which should be white (of which pixel values should be zero) for each of R, G, and B, as shown in FIG. 9(a).

FIG. 10(c) shows a result of the combination of the red, green, and blue images in FIG. 9(c) into the color image. In FIG. 10(c), the pixels (column 9a01 and column 9a02) of white (of which pixel values are zero) in FIG. 10(a) have been reproduced (column 9c01 and column 9c02).

It is to be noted that although the high frequency component of the blue image is added to the green and red images in the above example, the effects of the present invention can be obtained by adding the high frequency component of the blue image to only either one of the green image and the red image. The effects of the present invention can also be obtained by adding the high frequency component of the green image to the red image.

As described above, using the blue image data generated with the light receiving elements which are spaced more closely than the sizes of diffraction blur formed by the red light and by the green light, the red image data and the green image data are corrected to enhance their resolution, thus enabling to form a color image with high resolution, which would otherwise not be obtainable due to the diffraction limit.

The above example explains the use of the red, green, and blue images to represent a color image of the object. If red, green, and blue light is used, there in an advantage that an existing color image sensor employing a primary color system can be used to constitute the present invention.

Color representation with a complementary color system may also be used as in the case of the color representation with the primary color system.

In the case of using the complementary color system of cyan (red complement), magenta (green complement), and yellow (blue complement), the same processing as above is performed based on the size of diffraction blur formed by light of each complementary color or wavelength.

To be specific, a high frequency component is extracted from an image which is taken with yellow (blue complement) pixels spaced more closely than the sizes of diffraction blur formed by the red light and by the green light. The extracted high frequency component is then added to a cyan image or a magenta image, thus forming a corrected cyan image or a corrected magenta image. In this case, the pixel layout is that shown in FIG. 5(a) to FIG. 5(c) and FIG. 7 with its B, G, and R replaced by yellow, magenta, and cyan, respectively.

Second Embodiment

Next, an image generation system according to a second embodiment of the present invention shall be described in detail.

In the image processing apparatus according to the second embodiment, an object which is photographed using visible light is photographed also using ultraviolet light having the shortest wavelength, with pixels spaced more closely than the size of diffraction blur formed by the visible light, and a high frequency component of an ultraviolet light image is added to a visible light image.

Figure 11:
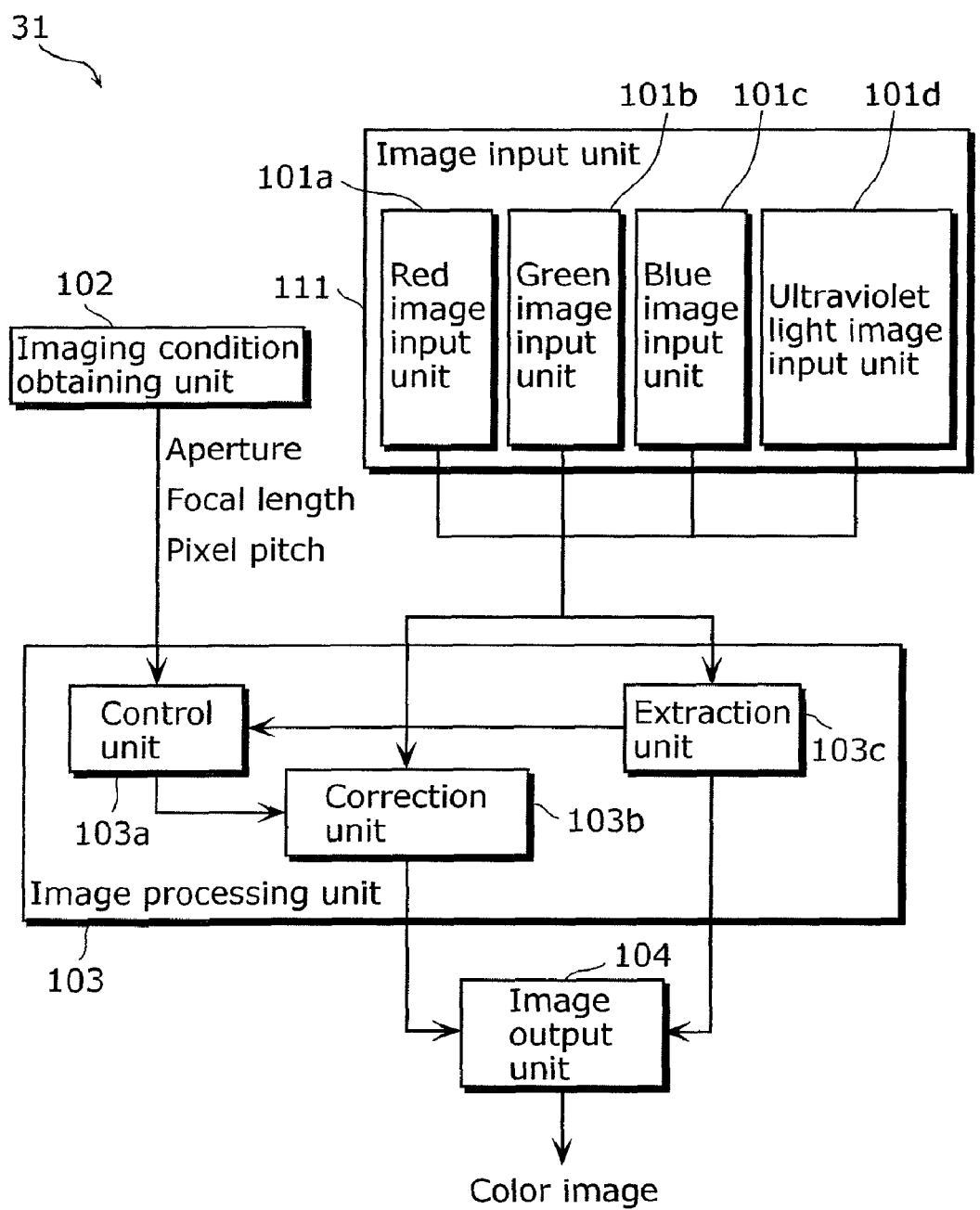
FIG. 11 is a functional block diagram showing a configuration of an image processing apparatus according to a second embodiment.

FIG. 11 shows a functional block diagram showing an internal configuration of an image processing apparatus 31 according to the second embodiment. As compared to the image processing apparatus 30 according to the first embodiment (see FIG. 2), the image processing apparatus 31 additionally includes, in an image input unit 111, an ultraviolet light image input unit 101d. The ultraviolet light image input unit 101d obtains ultraviolet light image data which represents an image of the object formed by ultraviolet light.

FIG. 12 shows an example of the pixel layout to be used in photographing. In FIG. 12, R, G, B, and UV denote pixel layouts in the image sensor to be used in photographing with red light, green light, blue light, and ultraviolet light, respectively. To capture an image by using ultraviolet light which is not required for the image to be observed, the ultraviolet light may be separated, for example, by a dichroic mirror or a dichroic prism as shown in FIG. 13 to form an image in advance, and from ultraviolet light image data, a high frequency component is extracted just as the high frequency component is extracted from the blue image data in the first embodiment, followed by adding the extracted high frequency component to each of the red image data, the green image data, and the blue image data.

Figure 14:
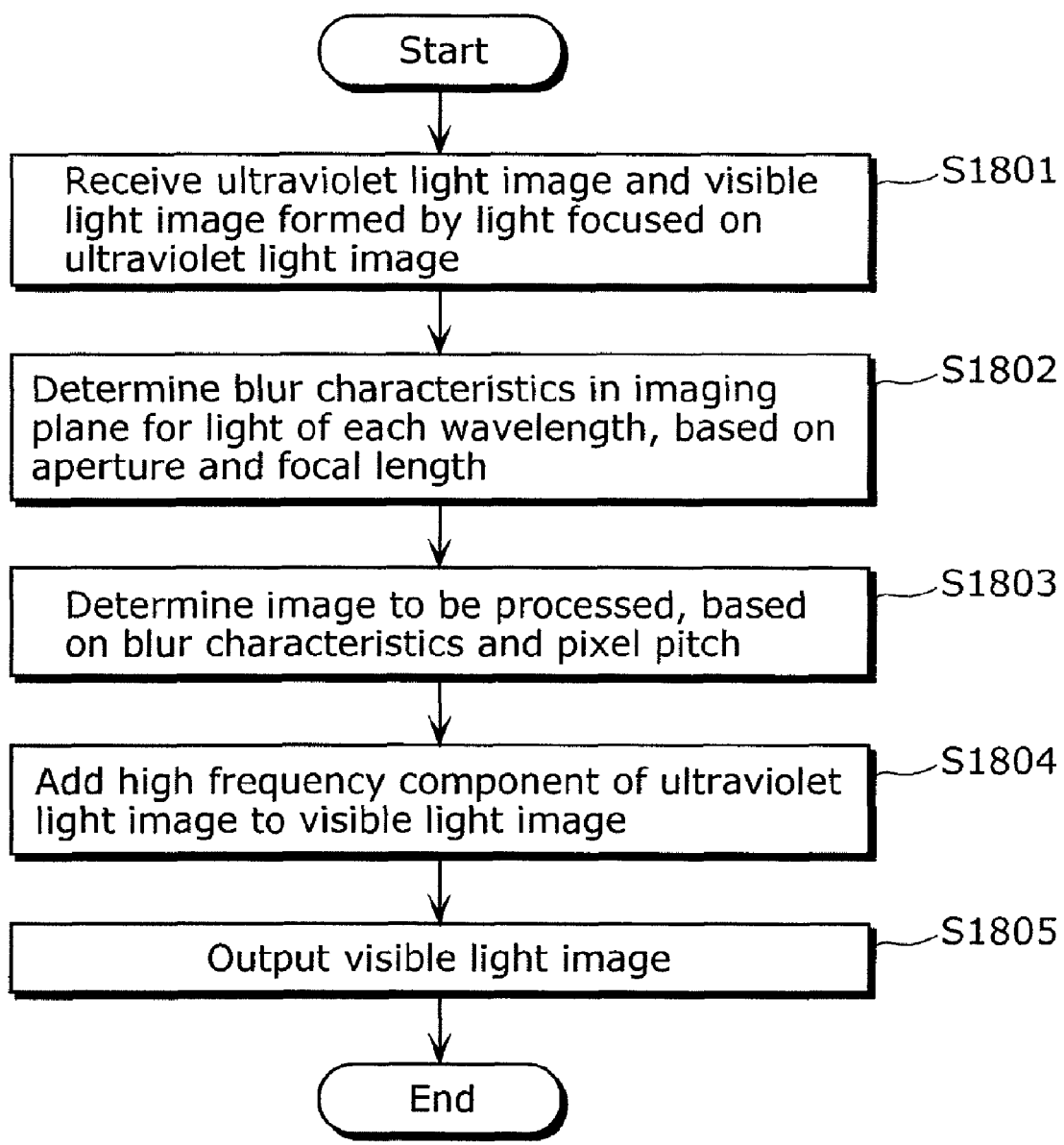
FIG. 14 is a flowchart showing operation of a second image processing apparatus.

FIG. 14 is a flowchart showing one example of the processes in the second embodiment, which are executed by the image processing apparatus 31. The processes from Step S1801 to Step S1805 are roughly the same as those from Step S410 to Step S405 in the first embodiment, but different in that the image input unit 111 inputs the ultraviolet light image data and the visible light image data in Step S1801 and that the high frequency component of the ultraviolet light image is added to the visible light image.

It is possible to enhance resolution of the visible light image, regardless of whether the visible light image is a color image or a black-and-white image, and the effects of the present invention can be thus obtained.

This configuration enables obtaining a visible light image (black-and-white or color image) with high resolution over the diffraction limit of visible light by extracting the high frequency component from the ultraviolet light image which is captured by using light of which amount for the visible light image is not necessarily reduced.

As an example using other light having a wavelength other than the visible light, an object may be captured by using infrared light and simultaneously captured by using visible light so that a high frequency component of a visible light image is added to an infrared light image, thereby generating a corrected infrared light image. Adding the high frequency component of the visible light image to the infrared light image makes it possible to form a high resolution image with use of infrared light which is otherwise hard to form a high definition image due to its diffraction blur larger than that of visible light.

Third Embodiment

Next, an image generation system according to a third embodiment of the present invention shall be described in detail.

In the image processing apparatus according to the first and second embodiments, an image with higher resolution can be obtained when all light with different wavelengths are focused at the same time to form the image. The third embodiment explains the image processing apparatus which executes favorable processing when the optical system includes a chromatic aberration.

Figure 15:
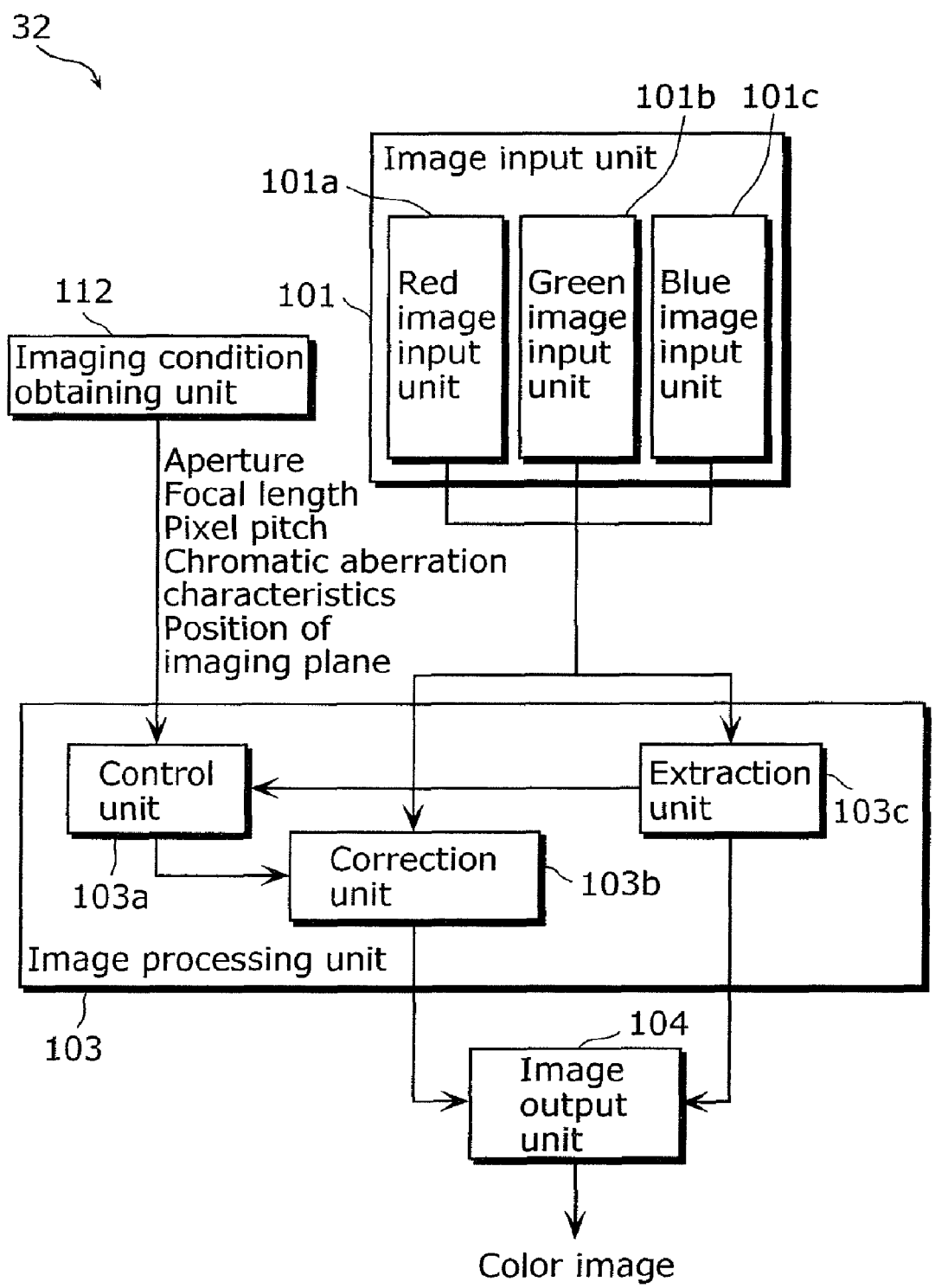
FIG. 15 is a functional block diagram showing a configuration of an image processing apparatus according to a third embodiment.

FIG. 15 shows a functional block diagram showing an internal configuration of an image processing apparatus 32 according to the third embodiment. The image processing apparatus 32 includes a imaging condition obtaining unit 112 instead of the imaging condition obtaining unit 102 of the image processing apparatus 30 (see FIG. 2) according to the first embodiment. The imaging condition obtaining unit 112 obtains chromatic aberration characteristics and a position of an imaging plane in addition to the aperture, the focal length, and the pixel pitch, of the optical system, as a imaging condition on which the image data obtained by the image input unit 101 is generated.

The chromatic aberration indicates characteristics of an optical system that light of different wavelengths, which have different refractive indices, are collected at different positions. FIG. 16(a) and FIG. 16(b) show examples of the chromatic aberration.

In FIG. 16(a), light coming from the left is refracted by a lens 301 and passes through an aperture 302, thereafter being collected. Here, red light (R), green light (G), and blue light (B) have different refractive indices and therefore are collected at positions 305, 304, and 303, respectively. In FIG. 16(a), paths of the red light, green light, and blue light are represented by broken lines, dotted lines, and solid lines, respectively.

In FIG. 16(a), concentric circles different in sizes schematically show states of the light of different colors, which is being collected, at the positions 303, 304, and 305. At a position that the light of a particular wavelength is collected most, the degree of collection of the light in other wavelengths is not necessarily the maximum.

Figure 16:
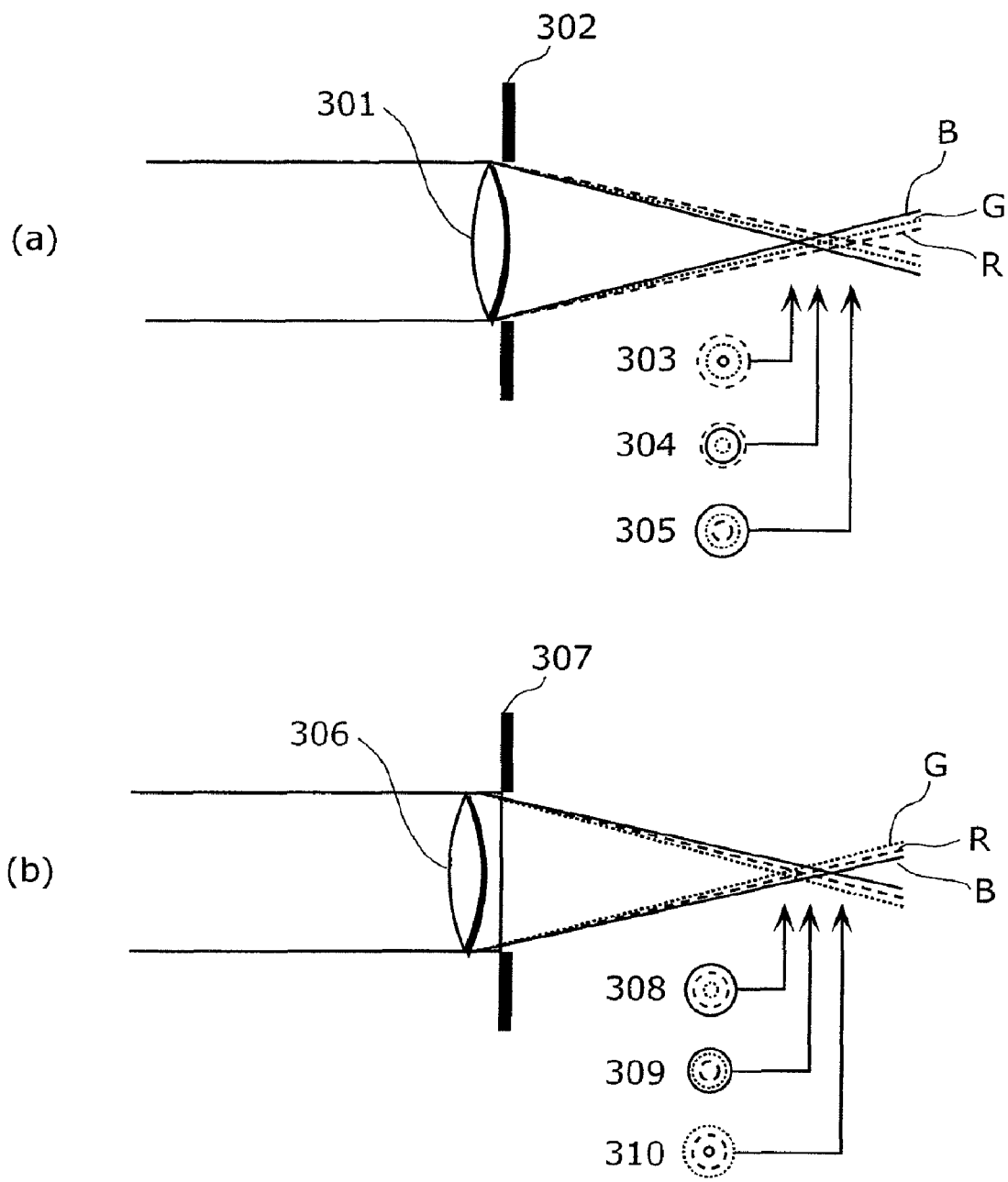
FIGS. 16(a) and 16(b) are views each showing an example of light being collected.

FIG. 16(b) shows an example of an optical system 306 having multiple lenses. Although the light having passed through an aperture 307 is collected at a different position from that in FIG. 16(a), the light of different wavelengths is still collected at different positions. In FIG. 16(b), concentric circles different in sizes schematically show states of the light of different colors, which is being collected, at positions 308, 309, and 310. Although FIG. 16 shows only the example of the ray of light coming in a horizontal direction from the left of the lens, rays of light coming in other directions than the horizontal direction also have light collection characteristics which are different for different wavelengths or directions. The chromatic aberration characteristic indicates these light collection characteristics and is determined depending on the lens system.

In the case of obtaining an image through an optical system which causes the chromatic aberration as above, it is desirable to use an image of an object captured by using light that is focused most on a wavelength image from which a high frequency component is extracted. This means that the blue image obtained at the position 303 is obtained in the case of FIG. 16(a) and that the blue image obtained at the position 310 is obtained in the case of FIG. 16(b). By setting the imaging plane at such a position, it is possible to obtain a short-wavelength image containing a lot of high frequency components, which can effectively enhance resolution of the other wavelength images with focus blur.

As for an image with focus blur, in the case where the size of the focus blur is already known as in the case of FIGS. 16(a) and 16(b), an image processed with focus blur removal may be generated in advance, and processing the image with the above correction for resolution enhancement will result in an image with higher resolution.

In the case of FIG. 16(a), the red image and the green image captured at the position 303 will have focus blur due to the chromatic aberration. The focus blur will have a size which is proportional to a displacement of the imaging plane relative to the focus position, along with a shape of the opening. The resultant blur characteristics are given by convolution of diffraction blur with focus blur and other blur due to aberration.

Figure 17:
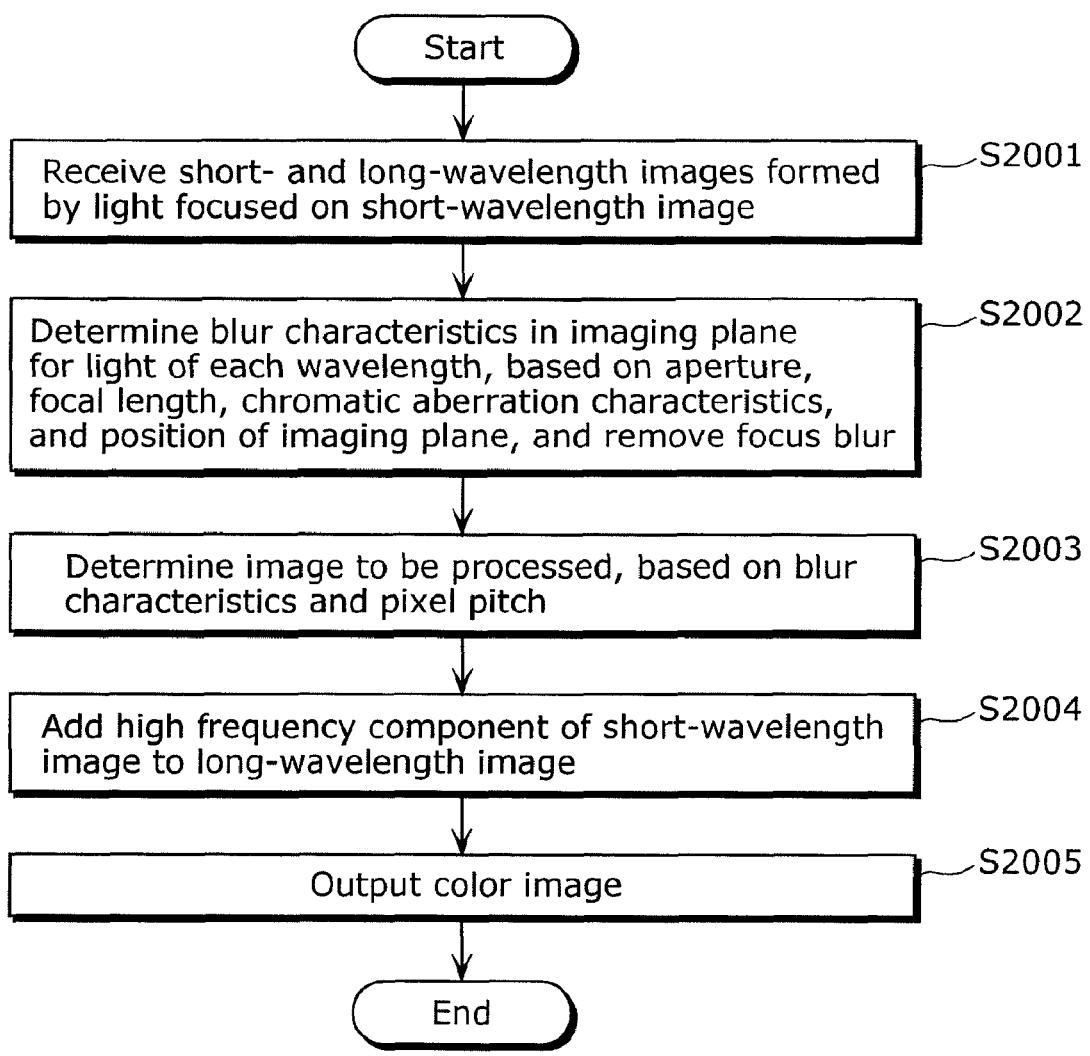
FIG. 17 is a flowchart showing operation of a third image processing apparatus.

FIG. 17 is a flowchart showing one example of the processes in the third embodiment, which are executed by the image processing apparatus 32. The processes from Step S2001 to Step S2005 are roughly the same as the processes from Step S401 to Step S405 in the first embodiment and different in Step S2002 where the imaging condition obtaining unit 102 obtains the above chromatic aberration characteristics and the above position of the imaging plane which are associated with the imaging system so that the characteristics of focus blur (shape and size of the blur) in the image of each color are determined, and an image restoration process is executed to remove the focus blur.

Referring to "A new sense for depth of field", IEEE Transaction on Pattern Analysis and Machine Intelligence, vol. 9, no. 4, pp. 523-531, 1987 (Non-Patent literature 1), assume that a radius of focus blur (focus blur characteristics) is denoted by "r", a focal length is "f", a distance from an optical system to an object is "z", a diameter of an opening (aperture) is "d", a distance between the optical system and an imaging plane (position of the imaging plane) is "v", and a constant depending on an image sensor is α, the relationship (Expression 1) applies. Here, the chromatic aberration characteristics are equivalent to the characteristics that the focal length "f" is different for each of wavelengths.

[Math 1]

$$r = \alpha \cdot d \cdot v |1/f - 1/v - 1/z| \quad \text{(Expression 1)}$$

In the case where the light is focused on a blue image, (Expression 1) is used to determine the distance "z" to an object where r=0, and the radius "r" of focus blur formed by light of other wavelengths having different focal lengths can be therefore calculated from the above relational expression. The chromatic aberration characteristics of the lens are thus used to determine sizes of focus blur in the red and green images.

As the shape of the focus blur is already known, the red and green images are produced in Step S2002 with the focus blur removed by image restoration means such as a Wiener filter and a projection filter based on the shape of blur function.

In Step S2003, between the red and green images with the focus blur removed, the image to be subject to the resolution enhancement process is determined, and in Step S2004, a high frequency component is added to the determined image.

With the configuration as above, even in the case of using the optical system causing the chromatic aberration, a high frequency component of the blue image (short wavelength image) which is formed by light of the shortest wavelength or light of the wavelength whose smallest area that the light can converge is the smallest, can be used to effectively enhance resolution of an image formed by light of other wavelengths.

Although it is desirable to capture an image by using the light which is adjusted to be focused on a high resolution image formed by the light of a short wavelength, the effects of the present invention can also be obtained in the case where all wavelength images have focus blur, even if the blur characteristics of combination of the focus blur and the diffraction blur are handled with the same process as that for the diffraction blur alone.

Moreover, due to the chromatic aberration of the optical system, the relation of light in terms of the size of their smallest areas that the light can converge may be different from the relation of the light in terms of the size of their actual wavelengths. In such a case, the effects of the present invention can be obtained by using a high frequency component of an image which is formed by the light having a wavelength in which a smallest area that the light can converge is the smallest, to enhance resolution of images of other wavelength components.

Furthermore, if the imaging condition obtaining unit 112 obtains a focus position (distance between the optical system and the imaging plane) in advance, the focus blur for an object located at a predetermined distance can be estimated by using the relational expression of (Expression 1). The focus blur is then removed by the image restoration means such as a Wiener filter and a projection filter as in the case of the restoration of blur due to the chromatic aberration. As to the remaining diffraction blur having different sizes for each of wavelengths, resolution of the images can be enhanced through the above Steps S2002 to S2005.

Fourth Embodiment

Next, an image generation system according to a fourth embodiment of the present invention shall be described in detail.

In the image processing apparatuses according to the first to third embodiments, the transformation into the frequency is applied so that the high frequency component is extracted from the short wavelength image and then added to the wavelength image containing the diffraction blur. In the image processing apparatus according to the fourth embodiment, extracting and adding the high frequency component are performed at the same time.

Figure 18:
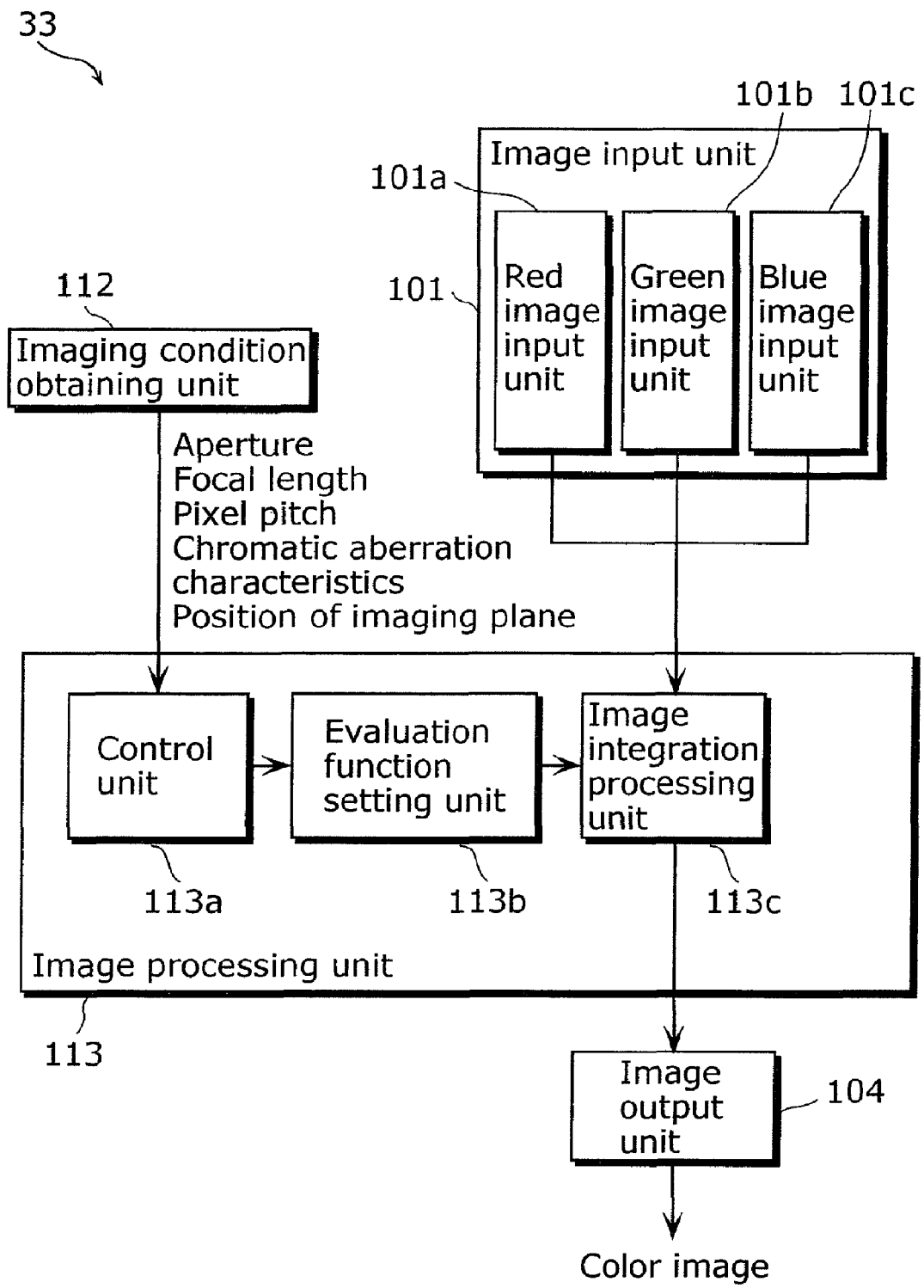
FIG. 18 is a functional block diagram showing a configuration of an image processing apparatus according to a fourth embodiment.

FIG. 18 shows a functional block diagram showing an internal configuration of an image processing apparatus 33 according to the fourth embodiment.

The image processing apparatus 33 is the same as the image processing apparatus 32 (FIG. 15) in the third embodiment except that an image processing unit 113 is provided instead of the image processing unit 103.

In the image processing unit 113, a control unit 113a determines a wavelength image which is to be subject to the correction process, based on the aperture, the focal length, the position of the imaging plane, the chromatic aberration characteristic, and the pixel pitch, of the optical system.

An evaluation function setting unit 113b sets an evaluation function which numerically represents a degree of how better the spatial color continuity (including continuity of pixel values and continuity of changes in the pixel values) of a target image that is combination of images of respective colors, is maintained.

An image integration processing unit 113c corrects the images of respective colors according to the set evaluation function so as to obtain the target image with the better-maintained spatial color continuity.

Correcting the images of respective colors so as to maintain the spatial color continuity of the target image, will make spatial changes of the respective colors similar, with the result that a high frequency component of a short wavelength image is added to a long wavelength image. At the same time, the short wavelength image is also processed so that the color continuity is maintained, which reduces generation of a false color (phenomenon that a color which does not exist in an object is generated locally at a color boundary or the like in an image).

Figure 19:
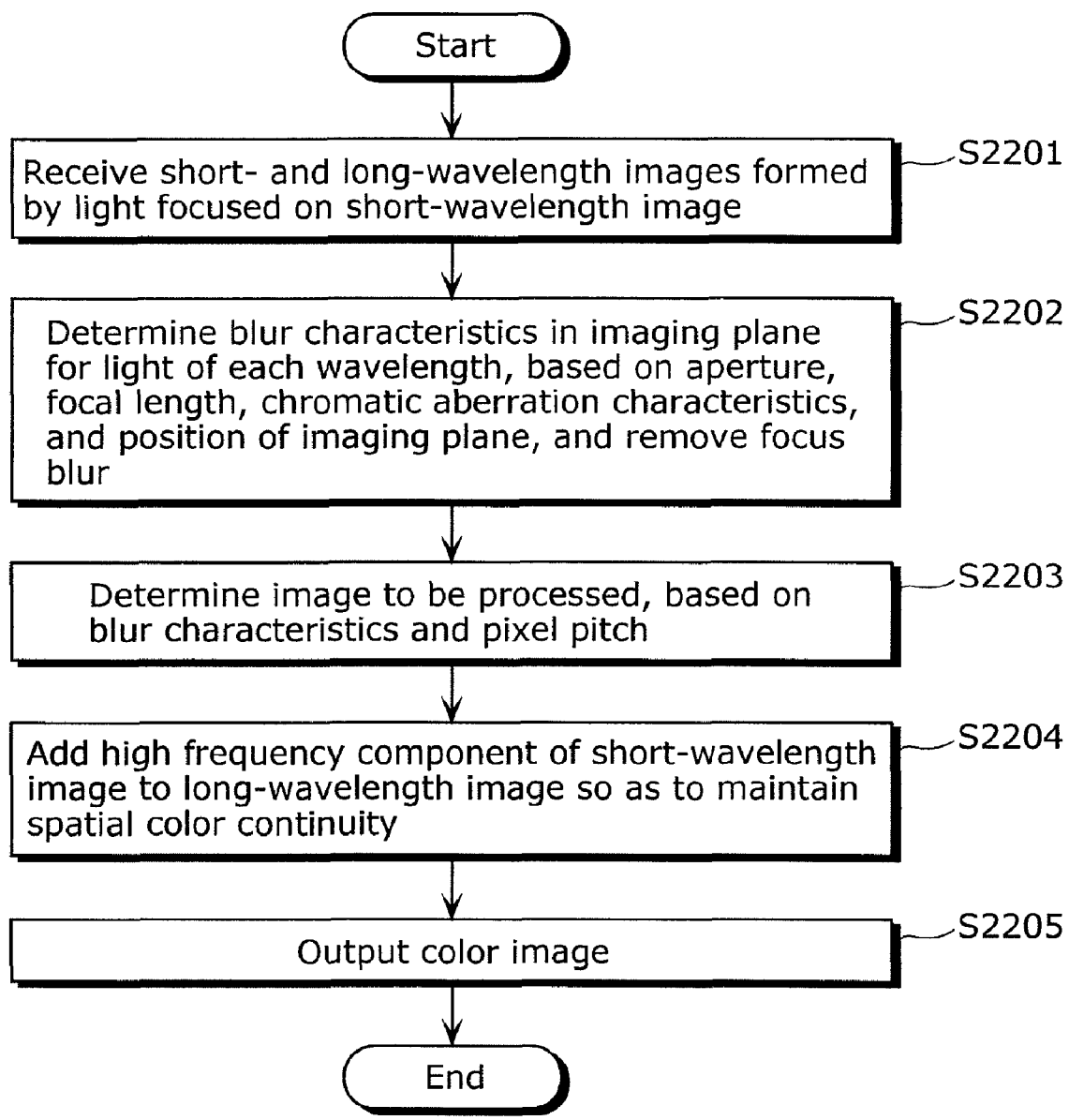
FIG. 19 is a flowchart showing operation of a fourth image processing apparatus.

FIG. 19 is a flowchart showing one example of the processes in the fourth embodiment, which are executed by the image processing apparatus 33. Processes in steps S2201 to S2203 and S2205 are the same as those in Steps S2001 to S2003 and S2005 in the third embodiment, and in Step S2204, the long wavelength image and the short wavelength image are processed so as to maintain the spatial color continuity (including continuity of pixel values and continuity of changes in the pixel values) of a target image that is combination of images of respective colors.

The following shall describe an example of the process for maintaining the spatial color continuity of the target image.

The evaluation function setting unit 113b sets an evaluation function J of which value is smaller as spatial changing patterns in the images of respective colors for a target image "g" are closer to each other (as a spatial change of the blue image has higher similarity to spatial changes of the red and green images), and the image integration processing unit 113c obtains the target image "g" with the evaluation function J at the minimum. One example of the evaluation function J is indicated in (Expression 2).

[Math 2]

$$J(g)=\|H_R R_H-R_L\|^2+\|H_G G_H-G_L\|^2+\|B_H-B_L\|^2+ \lambda_\theta \|Q_S C_\theta g\|^p+\lambda_\psi \|Q_S C_\psi g\|^p+\lambda_r \|Q_S C_r g\|^p \quad \text{(Expression 2)}$$

The evaluation function J is defined as a function of images of the respective colors of red, green, and blue (denoted by $R_H$, $G_H$, and $B_H$ as image vectors), which constitute the high resolution color image "g" that is to be produced. Resolution-reducing transformations from the images $R_H$ and $G_H$ of the respective colors for the target image "g" into input images $R_L$ and $G_L$ (vector notation) of the respective colors are denoted by $H_R$ and $H_G$, respectively. The resolution-reducing transformations $H_R$ and $H_G$ are such transformations as represented by (Expression 3) and (Expression 4), for example.

[Math 3]

$$R_L(x_{RL}, y_{RL}) = \sum_{(x',y')\in C} w_R(x', y') \cdot R_H(x(x_{RL})+x', y(y_{RL})+y') \quad \text{(Expression 3)}$$

[Math 4]

$$G_L(x_{GL}, y_{GL}) = \sum_{(x',y')\in C} w_G(x', y') \cdot G_H(x(x_{GL})+x', y(y_{GL})+y') \quad \text{(Expression 4)}$$

Pixel values of the input images are weighted sums of pixel values in local regions located around a corresponding position in the target image.

In (Expression 3) and (Expression 4), $R_H(x, y)$ and $G_H(x, y)$ represent pixel values of red (R) and green (G), respectively, at a pixel position (x, y) in the target image "g".

And RL ($x_{RL}$, $y_{RL}$) represents a pixel value at a pixel position ($x_{RL}$, $y_{RL}$) in the red input image, and GL ($x_{GL}$, $y_{GL}$) represents a pixel value at a pixel position ($x_{GL}$, $y_{GL}$) in the green input image.

Further, x ($x_{RL}$) and y ($y_{RL}$) represent an x, y coordinates of a corresponding pixel position in the target image to the pixel position ($x_{RL}$, $y_{RL}$) in the red input image, and x ($x_{GL}$), and y ($y_{GL}$) represent an x, y coordinates of a corresponding pixel position in the target image to the pixel position ($x_{RL}$, $y_{RL}$) in the green input image.

Furthermore, $w_R$ and $w_G$ represent weighted functions of pixel values in the target image with respect to pixel values in the input images of the red image and the green image, respectively. And (x', y')∈C represents an area of the local regions in which $w_R$ and $w_G$ are defined.

The sum of squared differences in pixel values at the corresponding pixel positions in the resolution-reduced images (in the case of the blue image, the same resolution images) and the input images is set as an evaluation condition for the evaluation function (the first, second and third terms of (Expression 2)). In other words, the evaluation condition is set by using a value indicating a magnitude of a difference vector between a vector which has as an element each pixel value contained in the resolution-reduced images, and a vector which has as an element each pixel value contained in the input image.

In (Expression 2), $Q_s$ in the forth term is an evaluation condition for evaluating spatial smoothness of the pixel values.

The following (Expression 5) and (Expression 6) respectively show $Q_{S1}$ and $Q_{S2}$, which are examples of $Q_s$.

(Math 5)

$$Q_{s2} = \sum_x \sum_y \left[ \begin{array}{l} \lambda_\theta(x, y) \cdot \left\{ \begin{array}{l} 4 \cdot \theta_H(x, y) - \\ \theta_H(x, y-1) - \\ \theta_H(x, y+1) - \\ \theta_H(x-1, y) - \\ \theta_H(x+1, y) \end{array} \right\}^2 + \\ \lambda_\varphi(x, y) \cdot \left\{ \begin{array}{l} 4 \cdot \varphi_H(x, y) - \\ \varphi_H(x, y-1) - \\ \varphi_H(x, y+1) - \\ \varphi_H(x-1, y) - \\ \varphi_H(x+1, y) \end{array} \right\}^2 + \\ \lambda_r(x, y) \cdot \left\{ \begin{array}{l} 4 \cdot r_H(x, y) - \\ r_H(x, y-1) - \\ r_H(x, y+1) - \\ r_H(x-1, y) - \\ r_H(x+1, y) \end{array} \right\}^2 \end{array} \right] \quad \text{(Expression 5)}$$

In (Expression 5), $\theta_H$ (x, y), $\psi_H$ (x, y), and $r_H$ (x, y), are pixel values at the pixel position (x, y) of the target image. These pixel values are represented as coordinate values in a spherical-coordinate system (θ, ψ, r) corresponding to the three-dimensional orthogonal space (so-called RGB color space) that is represented by the pixel values of red, green, and blue, respectively, and $\theta_H$ (x, y) and $\psi_H$ (x, y) represent two kinds of amplitude and $r_H$ (x, y) represents a moving radius.

Figure 20:
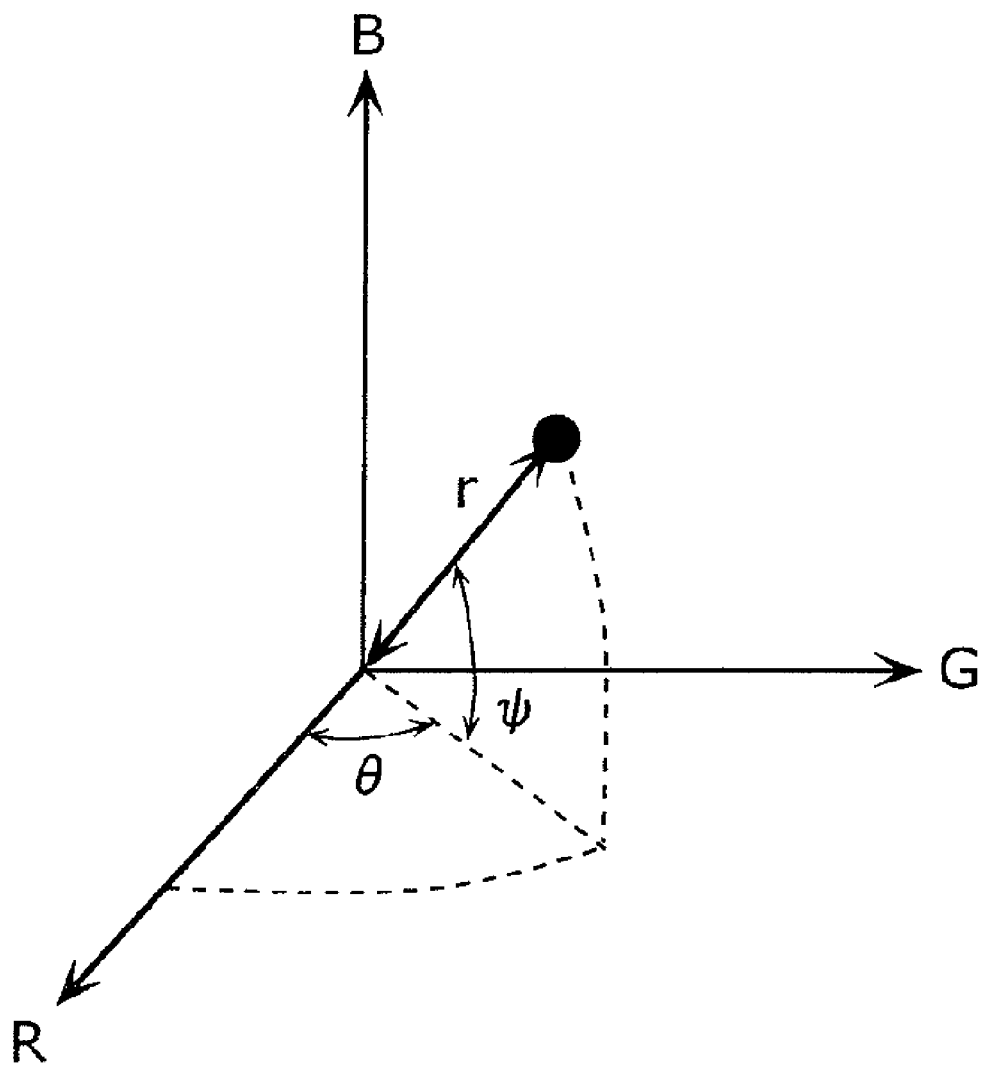
FIG. 20 is a view showing one example of combination of an RGB color space and a spherical coordinate system.

FIG. 20 shows an example of correspondence between the RGB color space and the spherical coordinate system (θ, ψ, r). In FIG. 20, as an example, the direction θ=0 is set as a positive direction of the R axis of the RGB color space, and the direction ψ=0 is set as a positive direction of the G axis of the RGB color space. The reference direction of the amplitude is not limited to the directions shown in FIG. 20 and may be other directions. According to the above correspondence, the pixel values of red, green, and blue are converted for each pixel from the coordinate values of the RGB color space into the coordinate values of the spherical-coordinate system (θ, ψ, r).

In the case of taking the pixel value of each pixel in the target image as a three-dimensional vector in the RGB color space, the representation of the three-dimensional vector in the spherical-coordinate system (θ, ψ, r) corresponding to the RGB color space allows for individual handling of a coordinate value along the r axis indicating a magnitude of the vector which represents brightness (synonymous with signal intensity and luminance) of the pixel, and coordinate values along the θ axis and ψ axis each indicating a direction of the vector which represents colorfulness (including hue, color difference, and saturation) of the pixel.

The above (Expression 5) defines the sum of squared second differences, in the xy-spatial direction, of the pixel values of target image represented in the spherical coordinate system. The condition $Q_{S1}$ defined in (Expression 5) has its value decreasing as changes in the pixel values, represented in the spherical-coordinate system, of spatially adjacent pixels in the target image are more uniform (that is, the colors of the pixels are more continuous).

The value of condition $Q_{S1}$ should be small, which means that colors of spatially adjacent pixels in the target image should continue.

Since changes in brightness of pixels and changes in colorfulness of pixels in an image attribute to physically different causes, desirable image quality can be obtained more easily by separately setting, as shown in (Expression 5), the condition regarding the continuity of pixel brightness (uniformity of changes in coordinate values along the r axis) (the third term in the square brackets of (Expression 5)) and the condition regarding the continuity of pixel colorfulness (uniformity of changes in coordinate values along the θ axis and the ψ axis) (the first and second terms in the square brackets of (Expression 5)).

According to the conditions set by using the coordinate values along the θ axis, the ψ axis, and the r axis, $\lambda_\theta(x, y)$, $\lambda_\psi(x, y)$, and $\lambda_r(x, y)$ are predetermined respectively as weights to be applied at the pixel position (x, y) in the target image. Alternatively, simple setting may also be applicable, which is independent of the pixel position or frame, for example, $\lambda_\theta(x, y) = \lambda_\psi(x, y) = 1.0$ and $\lambda_r(x, y) = 0.01$.

Further, this weight may be set to be small at such a position that pixel values in the image are expected to be discontinuous. Pixel values of adjacent pixels within a frame of the input image may be determined as being discontinuous when an absolute value of difference or second difference between the pixel values is equal to or greater than a predetermined value.

In addition, it is desirable that the weight to be applied to the condition regarding the continuity of pixel colorfulness be set to be larger than the weight to be applied to the condition regarding the continuity of pixel brightness. This is because pixel brightness is more likely to change than is pixel colorfulness in an image due to changes in the direction of a surface of the object (direction of the normal) caused by irregularities or movement of the surface of the object.

It is to be noted that although the sum of squared second differences, in the xy-spatial direction, of the pixel values of target image represented in the spherical coordinate system, is set as the condition $Q_{S1}$ in (Expression 5), the sum of absolute second differences, or the sum of squared first differences or the sum of absolute first differences may also be set as the condition.

In the above explanation, the color space condition is set by using the spherical-coordinate system (θ, ψ, r) corresponding to the RGB color space, but an available coordinate system is not limited to the spherical-coordinate system, and the same effects as those described above can be obtained by setting the condition in a new orthogonal coordinate system having coordinate axes with which the pixel brightness and colorfulness are separated easily.

The coordinate axis of the new orthogonal coordinate system may be directed along the eigenvector (set as an eigenvector axis) which is obtained by analyzing a principal component of frequency distribution of pixel values, in the RGB color space, which are contained in the input video or other reference videos.

[Math 6]

$$Q_{s2} = \sum_x \sum_y \begin{bmatrix} \lambda_{C1}(x, y) \cdot \begin{Bmatrix} 4 \cdot C_1(x, y) - \\ C_1(x, y-1) - \\ C_1(x, y+1) - \\ C_1(x-1, y) - \\ C_1(x+1, y) \end{Bmatrix}^2 + \\ \lambda_{C2}(x, y) \cdot \begin{Bmatrix} 4 \cdot C_2(x, y) - \\ C_2(x, y-1) - \\ C_2(x, y+1) - \\ C_2(x-1, y) - \\ C_2(x+1, y) \end{Bmatrix}^2 + \\ \lambda_{C3}(x, y) \cdot \begin{Bmatrix} 4 \cdot C_3(x, y) - \\ C_3(x, y-1) - \\ C_3(x, y+1) - \\ C_3(x-1, y) - \\ C_3(x+1, y) \end{Bmatrix}^2 \end{bmatrix}$$ (Expression 6)

In (Expression 6), $C_1(x, y)$, $C_2(x, y)$, and $C_3(x, y)$ are rotation transformations which transform coordinate values, in the RGB color space, of the pixel values of red, green, and blue at the pixel position (x, y) in the target image, into coordinate values along coordinate axes $C_1$, $C_2$, and $C_3$ in the new orthogonal coordinate system.

The above (Expression 6) defines the sum of squared second differences, in the xy-spatial direction, of the pixel values of target image represented in the new orthogonal coordinate system. The condition $Q_{S2}$ defined in (Expression 6) has its value decreasing as changes in the pixel values, represented in the new orthogonal coordinate system, of spatially adjacent pixels in each frame of the target image are more uniform (that is, the pixel values are more continuous).

The value of condition $Q_{S2}$ should be small, which means that colors of spatially adjacent pixels in the target image should continue.

According to the conditions set by using the coordinate values along the $C_1$ axis, the $C_2$ axis, and the $C_3$ axis, $\lambda_{C1}(x, y)$, $\lambda_{C2}(x, y)$, and $\lambda_{C3}(x, y)$ are predetermined respectively as weights to be applied at the pixel position (x, y) in the target image.

In the case where the $C_1$ axis, the $C_2$ axis, and the $C_3$ axis are the eigenvector axes, separate setting of $\lambda_{C1}(x, y)$, $\lambda_{C2}(x, y)$, and $\lambda_{C3}(x, y)$ along these eigenvector axes brings an advantage that λ can be set at a favorable value in accordance with a value of variance, which is different for each of the eigenvector axes. This means that it is expected that in the direction towards non-principal components, the variable will be smaller and the sum of squared second differences will be smaller, which makes the value of λ larger. Inversely, in the direction towards the principal component, the value of λ is made relatively smaller.

So far, the examples of the two kinds of the conditions $Q_{S1}$ and $Q_{S2}$ have been explained. As the condition $Q_s$, either $Q_{S1}$ or $Q_{S2}$ may be used.

For example, the use of the condition $Q_{S1}$ given by (Expression 5) has an advantage that it will be easier to generate high quality images, by introducing the spherical-coordinate system (θ, ψ, r) because the coordinate values along the θ axis and ψ axis, which represent color information, and the coordinate value along the r axis, which represents signal intensity, are separately used to set the condition, and in setting the condition, it is possible to apply a favorable weighting parameter λ to each of the color information and the signal intensity.

The use of the condition $Q_{S2}$ given by (Expression 6) has an advantage that the computation can be simplified because the condition is set with the coordinate values in the new orthogonal coordinate system which are obtained from the coordinate values in the RGB color space through the linear (rotation) transformation.

Further, the conversion from the eigenvector axes into the coordinate axes $C_1$, $C_2$, and $C_3$ in the new orthogonal coordinate system enables the condition setting that uses the coordinate values of the eigenvector axes reflecting changes in color by which more pixels are influenced, with the result that the image quality of final target image can be expected to be higher as compared to the condition setting that simply uses the pixel values of red, green, and blue color components.

It is to be noted that the evaluation function J is not limited to the above, and the term in (Expression 2) may be replaced by a term composed of similar expressions, or a new term representing a different condition may be added.

Next, the image integration processing unit 113c obtains pixel values of target image with which the value J in (Expression 2) is as small as possible (desirably the minimum), thereby generating images of the respective colors $R_H$, $G_H$, and $B_H$ for the target image. The target image g with the evaluation function J at the minimum may also be obtained, for example, by solving the equation of (Expression 7) where all the expressions that differentiate J with respect to the pixel value components of the respective color images $R_H$, $G_H$, and $B_H$ for the target image are set at zero, or by using an iterative computation-type optimization approach such as the steepest descent method.

[Math 7]

$$\frac{\partial J}{\partial R_H(x, y)} = \frac{\partial J}{\partial G_H(x, y)} = \frac{\partial J}{\partial B_H(x, y)} = 0 \quad \text{(Expression 7)}$$

As above, the high frequency component is extracted and simultaneously added to the wavelength image containing diffraction blur in a manner that all the color images will have smooth spatial color changes, resulting in an effect that the false color which could be generated in the case of forming color images can be reduced better than by modifying only the long wavelength images (the red image and the green image) and combining them with the short wavelength image (the blue image).

Figure 21:
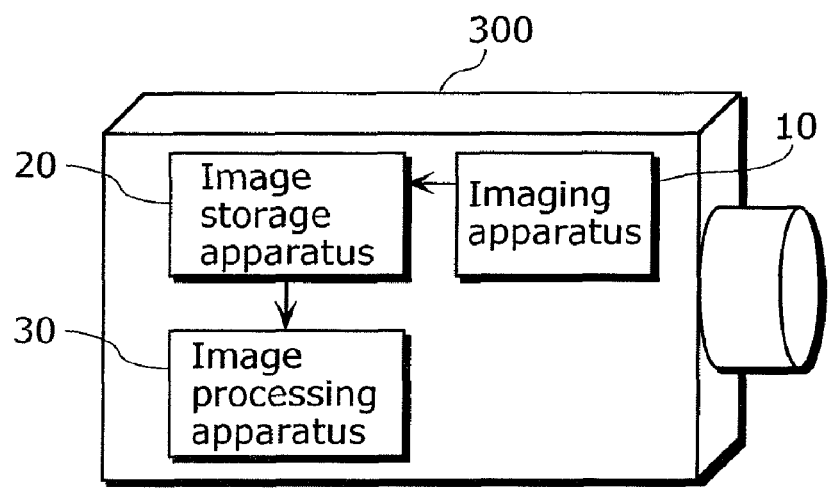
FIG. 21 is a block diagram showing a configuration of a camera as a variation of the image generation system.
Figure 22:
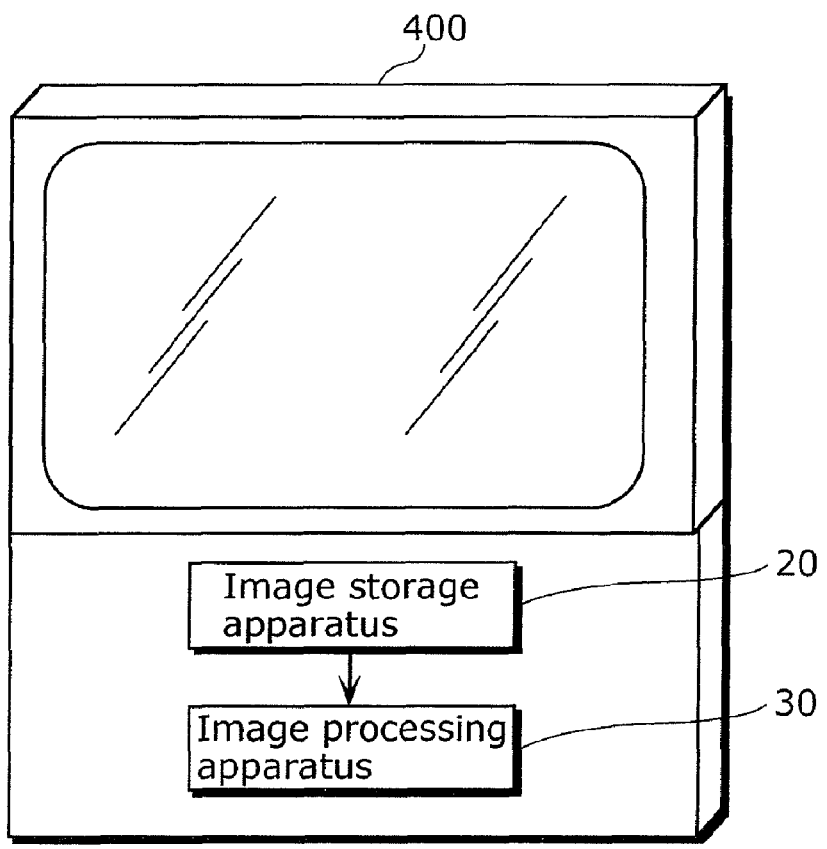
FIG. 22 is a block diagram showing a configuration of display equipment as a variation of the image generation system.

It is to be noted that although the above-described examples explain the operations of the image generation system 100, the present invention includes a camera 300 as shown in FIG. 21, which is obtained by removing the display apparatus 40 from the image generation system 100 shown in FIG. 1. Further, the present invention also includes a camera with a video recording and reproducing function, which camera has a structure that the display apparatus 40 is added to the camera 300 shown in FIG. 20.

Furthermore, the present invention also includes display equipment 400 such as a television, which is obtained by removing the imaging apparatus 10 from the image generation system 100 shown in FIG. 1. Such display equipment 400 enables generating and displaying a target video at a frame rate enhanced, using as an input video a video of multiple color components recorded in advance.

So far, the image processing apparatus according to the present invention has been explained based on the embodiments, but is not limited to these embodiments. Any variations of the embodiments which a person skilled in the art can think of are included in the present invention.

A part or all of the image generation processing performed by the image processing apparatus according to the present invention may be performed by a dedicated hardware device. Or, a computer terminal apparatus, a communication device placed in a wireless base station or the like, or a CPU integrated in a standalone computer may execute a certain program to perform the image generation processing of the present invention.

INDUSTRIAL APPLICABILITY

The present invention can be used not only as an image processing apparatus which generates a new image from a multicolor image containing diffraction blur and light of a wavelength, particularly as an image processing apparatus which generates an image with high resolution over a diffraction limit, from a color image containing diffraction blur and a short wavelength color image obtained at intervals shorter than the size of the diffraction blur, but also as a video device or system, a video synthesis apparatus, a video editing apparatus, an image reconstruction apparatus, an image reconstruction program, and the like, in which such an image processing apparatus is incorporated.

REFERENCE ELEMENTS

10 Imaging apparatus
20 Image storage apparatus
30-33 Image processing apparatus
40 Display apparatus
100 Image generation system
101, 111 Image input unit
101a Red image input unit
101b Green image input unit
101c Blue image input unit
101d Ultraviolet light image input unit
102, 112 Imaging condition obtaining unit
103, 113 Image processing unit
103a Control unit
103b Correction unit
103c Extraction unit
104 Image output unit
113a Control unit
113b Evaluation function setting unit
113c Image integration processing unit
300 Camera
301 Lens
302, 307 Aperture
306 Optical system
400 Display equipment

The invention claimed is:
1. An image generation system comprising:
a plurality of light receiving elements, each of the plurality of light receiving elements being for receiving a corresponding light of light (i) having different wavelengths and (ii) including ultraviolet light, so as to generate a plurality of pieces of image data, such that each of the plurality of pieces of image data represents an image of a same object formed by the corresponding light, and such that light receiving elements, of the plurality of light receiving elements, that receive the ultraviolet light are arranged at an interval shorter than a size of a circle of least confusion of light having a wavelength longer than a wavelength of the ultraviolet light;

an image input circuit that receives the plurality of pieces of image data; and an image processing circuit that corrects first image data included in the plurality of pieces of image data, by adding, to the first image data, a spatial high frequency component contained in second image data included in the plurality of pieces of image data, the first image data corresponding to the light having the wavelength longer than the wavelength of the ultraviolet light, and the second image data corresponding to the ultraviolet light.

2. An image generation system comprising:

a plurality of light receiving elements, each of the plurality of light receiving elements being for receiving a corresponding light of light having different wavelengths, so as to generate a plurality of pieces of image data, such that each of the plurality of pieces of image data represents an image of a same object formed by the corresponding light, and such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;

an image input circuit that receives the plurality of pieces of image data;

an image processing circuit that corrects first image data included in the plurality of pieces of image data, by adding, to the first image data, a spatial high frequency component contained in second image data included in the plurality of pieces of image data, the first image data corresponding to the light having the first wavelength, and the second image data corresponding to the light having the second wavelength; and a capture condition obtaining circuit that obtains capture condition data indicating an aperture value, which is a capture condition according to which the first image data is generated, wherein the image processing circuit (i) determines whether or not the first image data needs to be corrected, based on the obtained capture condition data, and (ii) corrects the first image data only when the image processing circuit determines that the first image data needs to be corrected.

3. An image generation system comprising:

a plurality of light receiving elements, each of the plurality of light receiving elements being for receiving a corresponding light of light having different wavelengths, so as to generate a plurality of pieces of image data, such that each of the plurality of pieces of image data represents an image of a same object formed by the corresponding light, and such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;

an image input circuit that receives the plurality of pieces of image data;

an image processing circuit that corrects first image data included in the plurality of pieces of image data, by adding, to the first image data, a spatial high frequency component contained in second image data included in the plurality of pieces of image data, the first image data corresponding to the light having the first wavelength, and the second image data corresponding to the light having the second wavelength; and a capture condition obtaining circuit that obtains capture condition data indicating a focal length, which is a capture condition according to which the first image data is generated, wherein the image processing circuit (i) determines whether or not the first image data needs to be corrected, based on the obtained capture condition data, and (ii) corrects the first image data only when the image processing circuit determines that the first image data needs to be corrected.

4. An image generation system comprising:

a plurality of light receiving elements, each of the plurality of light receiving elements being for receiving a corresponding light of light having different wavelengths, so as to generate a plurality of pieces of image data, such that each of the plurality of pieces of image data represents an image of a same object formed by the corresponding light, and such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;

an image input circuit that receives the plurality of pieces of image data;

an image processing circuit that corrects first image data included in the plurality of pieces of image data, by adding, to the first image data, a spatial high frequency component contained in second image data included in the plurality of pieces of image data, the first image data corresponding to the light having the first wavelength, and the second image data corresponding to the light having the second wavelength; and a capture condition obtaining circuit that obtains capture condition data indicating a position of a plane in which the plurality of light receiving elements are provided, the position of the plane being a capture condition according to which the first image data is generated, wherein the image processing circuit performs processing to remove a focus blur in the first image data in accordance with a displacement of the plane in which the plurality of light receiving elements are provided and having the position indicated by the obtained capture condition data, relative to a position according to which the light having the first wavelength is focused.

5. An image generation system comprising:

a plurality of light receiving elements, each of the plurality of light receiving elements being for receiving a corresponding light of red light, green light and blue light, so as to generate a plurality of pieces of image data, such that each of the plurality of pieces of image data represents an image of a same object formed by the corresponding light of the red light, the green light and the blue light, and such that light receiving elements, of the plurality of light receiving elements, that receive the blue light are arranged at an interval shorter than a size of a circle of least confusion of a target light that is at least one of the red light and the green light;

an image input circuit that receives red image data representing an image of the object formed by the red light, green image data representing an image of the object formed by the green light, and blue image data representing an image of the object formed by the blue light; and an image processing circuit that corrects at least one of the red image data and the green image data that represents the image of the object formed by the target light, by adding a spatial high frequency component contained in the blue image data, to the at least one of the red image data and the green image data.

6. An image generation system comprising:
a plurality of light receiving elements, each of the plurality of light receiving elements being for receiving a corresponding light of light having different wavelengths, so as to generate a plurality of pieces of image data, such that each of the plurality of pieces of image data represents an image of a same object formed by the corresponding light, and such that light receiving elements, of the plurality of light receiving elements, that receive light having a shortest wavelength from among the different wavelengths are arranged at an interval shorter than a size of a circle of least confusion of light having another wavelength from among the different wavelengths;
an image input circuit that receives the plurality of pieces of image data; and
an image processing circuit that corrects target image data included in the plurality of pieces of image data, by adding, to the target image data, a spatial high frequency component contained in reference image data included in the plurality of pieces of image data, the reference image data corresponding to the light having the shortest wavelength, and the target image data corresponding to the light having the other wavelength.

7. An image generation system comprising:
a plurality of light receiving elements, each of the plurality of light receiving elements being for receiving a corresponding light of light having different wavelengths, so as to generate a plurality of pieces of image data, such that each of the plurality of pieces of image data represents an image of a same object formed by the corresponding light, and such that light receiving elements, of the plurality of light receiving elements, that receive light having a second wavelength in which a size of a circle of least confusion is smallest from among the different wavelengths, are arranged at an interval shorter than a size of a circle of least confusion of light having a first wavelength;
an image input circuit that receives the plurality of pieces of image data; and
an image processing circuit that corrects first image data included in the plurality of pieces of image data, by adding, to the first image data, a spatial high frequency component contained in second image data included in the plurality of pieces of image data, the second image data corresponding to the light having the second wavelength, and the first image data corresponding to the light having the first wavelength.

8. An image generation method comprising:
generating a plurality of pieces of image data, such that each of the plurality of pieces of image data represents an image of a same object formed by a corresponding light of light (i) having different wavelengths and (ii) including ultraviolet light, the plurality of pieces of image data being generated by a plurality of light receiving elements, each of the plurality of light receiving elements being for receiving the corresponding light of the light (i) having the different wavelengths and (ii) including the ultraviolet light, such that light receiving elements, of the plurality of light receiving elements, that receive the ultraviolet light are arranged at an interval shorter than a size of a circle of least confusion of light having a wavelength longer than a wavelength of the ultraviolet light;
receiving, via an image input circuit, the plurality of pieces of image data; and
correcting, via an image processing circuit, first image data included in the plurality of pieces of image data, by adding, to the first image data, a spatial high frequency component contained in second image data included in the plurality of pieces of image data, the first image data corresponding to the light having the wavelength longer than the wavelength of the ultraviolet light, and the second image data corresponding to the ultraviolet light.

9. An image generation method comprising:
generating a plurality of pieces of image data, such that each of the plurality of pieces of image data represents an image of a same object formed by a corresponding light of light having different wavelengths, the plurality of pieces of image data being generated by a plurality of light receiving elements, each of the plurality of light receiving elements being for receiving the corresponding light of the light having the different wavelengths, such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;
receiving, via an image input circuit, the plurality of pieces of image data;
correcting, via an image processing circuit, first image data included in the plurality of pieces of image data, by adding, to the first image data a spatial high frequency component contained in second image data included in the plurality of pieces of image data, the first image data corresponding to the light having the first wavelength, and the second image data corresponding to the light having the second wavelength; and
obtaining, via a capture condition obtaining circuit, capture condition data indicating an aperture value, which is a capture condition according to which the first image data is generated,
wherein, in the correcting of the first image data, the image processing circuit determines, based on the obtained capture condition data, whether or not the first image data needs to be corrected, and only when the image processing circuit determines that the first image data needs to be corrected, the image processing circuit corrects the first image data.

10. An image generation method comprising:
generating a plurality of pieces of image data, such that each of the plurality of pieces of image data represents an image of a same object formed by a corresponding light of light having different wavelengths, the plurality of pieces of image data being generated by a plurality of light receiving elements, each of the plurality of light receiving elements being for receiving the corresponding light of the light having the different wavelengths, such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;

receiving, via an image input circuit, the plurality of pieces of image data;

correcting, via an image processing unit, first image data included in the plurality of pieces of image data, by adding, to the first image data, a spatial high frequency component contained in second image data included in the plurality of pieces of image data, the first image data corresponding to the light having the first wavelength, and the second image data corresponding to the light having the second wavelength; and obtaining, via a capture condition obtaining circuit, capture condition data indicating a focal length, which is a capture condition according to which the first image data is generated, wherein, in the correcting of the first image data, the image processing circuit determines, based on the obtained capture condition data, whether or not the first image data needs to be corrected, and only when the image processing circuit determines that the first image data needs to be corrected, the image processing circuit corrects the first image data.

11. An image generation method comprising:

generating a plurality of pieces of image data, such that each of the plurality of pieces of image data represents an image of a same object formed by a corresponding light of light having different wavelengths, the plurality of pieces of image data being generated by a plurality of light receiving elements, each of the plurality of light receiving elements being for receiving the corresponding light of the light having the different wavelengths, such that light receiving elements, of the plurality of light receiving elements, that receive the corresponding light having a second wavelength, from among the light having the different wavelengths, are arranged at an interval shorter than a size of a circle of least confusion of light having a first wavelength longer than the second wavelength;

receiving, via an image input circuit, the plurality of pieces of image data;

correcting, via an image processing circuit, first image data included in the plurality of pieces of image data, by adding, to the first image data, a spatial high frequency component contained in second image data included in the plurality of pieces of image data, the first image data corresponding to the light having the first wavelength, and the second image data corresponding to the light having the second wavelength; and obtaining, via a capture condition obtaining circuit, capture condition data indicating a position of a plane in which the plurality of light receiving elements are provided, the position of the plane being a capture condition according to which the first image data is generated, wherein, in the correcting of the first image data, the image processing circuit performs processing to remove a focus blur in the first image data in accordance with a displacement of the plane in which the plurality of light receiving elements are provided and having the position indicated by the obtained capture condition data, relative to a position according to which the light having the first wavelength is focused.

12. An image generation method comprising:

generating a plurality of pieces of image data, such that each of the plurality of pieces of image data represents an image of a same object formed by a corresponding light of red light, green light and blue light, the plurality of pieces of image data being generated by a plurality of light receiving elements, each of the plurality of light receiving elements being for receiving the corresponding light of the red light, the green light and the blue light, such that light receiving elements, of the plurality of light receiving elements, that receive the blue light are arranged at an interval shorter than a size of a circle of least confusion of a target light that is at least one of the red light and the green light;

receiving, via an image input circuit, red image data representing an image of the object formed by the red light, green image data representing an image of the object formed by the green light, and blue image data representing an image of the object formed by the blue light; and correcting, via an image processing circuit, at least one of the red image data and the green image data that represents the image of the object formed by the target light, by adding a spatial high frequency component contained in the blue image data, to the at least one of the red image data and the green image data.

13. An image generation method comprising:

generating a plurality of pieces of image data, such that each of the plurality of pieces of image data represents an image of a same object formed by a corresponding light of light having different wavelengths, the plurality of pieces of image data being generated by a plurality of light receiving elements, each of the plurality of light receiving elements being for receiving the corresponding light of the light having the different wavelengths, such that light receiving elements, of the plurality of light receiving elements, that receive the corresponding light having a shortest wavelength, from among the light having the different wavelengths, are arranged at an interval shorter than a size of a circle of least confusion of light having another wavelength from among the different wavelengths;

receiving, via an image input circuit, the plurality of pieces of image data; and correcting, via an image processing circuit, target image data included in the plurality of pieces of image data, by adding, to the target image data a spatial high frequency component contained in reference image data included in the plurality of pieces of image data, the reference image data corresponding to the light having the shortest wavelength, and the target image data corresponding to the light having the other wavelength.

14. An image generation method comprising:

generating a plurality of pieces of image data, such that each of the plurality of pieces of image data represents an image of a same object formed by a corresponding light of light having different wavelengths, the plurality of pieces of image data being generated by a plurality of light receiving elements, each of the plurality of light receiving elements being for receiving the corresponding light of the light having the different wavelengths, such that light receiving elements, of the plurality of light receiving elements, that receive the corresponding light having a second wavelength in which a size of a circle of least confusion is smallest from among the different wavelengths, are arranged at an interval shorter than a size of a circle of least confusion of light having a first wavelength;

receiving, via an image input circuit, the plurality of pieces of image data; and correcting, via an image processing circuit, first image data included in the plurality of pieces of image data, by adding, to the first image data, a spatial high frequency component contained in second image data included in the plurality of pieces of image data, the second image data corresponding to the light having the second wavelength, and the first image data corresponding to the light having the first wavelength.

15. A non-transitory computer-readable recording medium having a program recorded thereon, the program for processing an image, and the program causing a computer to execute the image generation method according to claim 8.

16. A non-transitory computer-readable recording medium having a program recorded thereon, the program for processing an image, and the program causing a computer to execute the image generation method according to claim 9.

17. A non-transitory computer-readable recording medium having a program recorded thereon, the program for processing an image, and the program causing a computer to execute the image generation method according to claim 10.

18. A non-transitory computer-readable recording medium having a program recorded thereon, the program for processing an image, and the program causing a computer to execute the image generation method according to claim 11.

19. A non-transitory computer-readable recording medium having a program recorded thereon, the program for processing an image, and the program causing a computer to execute the image generation method according to claim 12.

20. A non-transitory computer-readable recording medium having a program recorded thereon, the program for processing an image, and causing a computer to execute the image generation method according to claim 13.

\* \* \* \* \*